US008000269B1

(12) United States Patent
Rae et al.

(10) Patent No.: US 8,000,269 B1
(45) Date of Patent: *Aug. 16, 2011

(54) CALL PROCESSING WITH VOICE OVER INTERNET PROTOCOL TRANSMISSION

(75) Inventors: Robert L. Rae, Plano, TX (US); Thomas R. Spadaro, Burlington, NJ (US)

(73) Assignee: Securus Technologies, Inc., Dallas TX (*) Notice: Subject to any disclaimer, the term of this patent is extended or adjusted under 35 U.S.C. 154(b) by 1098 days.

This patent is subject to a terminal disclaimer.

(21) Appl. No.: 10/800,473

(22) Filed: Mar. 15, 2004

Related U.S. Application Data

(63) Continuation-in-part of application No. 09/905,014, filed on Jul. 13, 2001, and a continuation-in-part of application No. 10/642,532, filed on Aug. 15, 2003.

(51) Int. Cl.
*H04L 12/18* (2006.01)
(52) U.S. Cl. .......................... 370/269; 370/466
(58) Field of Classification Search ............ 370/260, 370/261, 351–356, 396, 398, 466
See application file for complete search history.

(56) References Cited

U.S. PATENT DOCUMENTS

| | | |
|---|---|---|
| 3,096,404 A | 7/1963 | Semon |
| 3,113,185 A | 12/1963 | Semon |
| 3,350,515 A | 10/1967 | Semon |
| 3,397,288 A | 8/1968 | Semon |
| 3,398,288 A | 8/1968 | Sanders et al. |
| 3,626,107 A | 12/1971 | Armstrong et al. |
| 3,660,610 A | 5/1972 | Hestad et al. |
| 3,676,605 A | 7/1972 | Johnson |
| 3,798,382 A | 3/1974 | Hoven |
| 3,813,495 A | 5/1974 | Conerly |
| 3,829,617 A | 8/1974 | Caithamer et al. |
| 3,851,121 A | 11/1974 | Marvin |
| 3,864,519 A | 2/1975 | Owen |

(Continued)

FOREIGN PATENT DOCUMENTS

EP 0185365 A1 6/1986

(Continued)

OTHER PUBLICATIONS

"SciDyn VoIP Technology Now Available for Call Control Solutions", SciDyn Press Release, [online] [Retrieved on Nov. 4, 2005] Retrieved from: http://www.scidyn.com/nems/pr/0122pr.html.

(Continued)

*Primary Examiner* — Ricky Ngo
*Assistant Examiner* — Ben Liu
(74) *Attorney, Agent, or Firm* — Fenwick & West LLP

(57) ABSTRACT

Disclosed are systems and methods which provide call processing for a plurality of telephones at a site for which calling services are provided. Call control functionality is distributed to remote locations using data networks according to embodiments. The aforementioned data networks and/or separate data networks are used to carry call content using voice over Internet protocols (VoIP). Embodiments utilize VoIP to carry calls from a location at which calling services are provided to a centralized call processing platform providing call processing functionality, such as calling party identification, call validation, call routing, and connection to the public switched telephone network (PSTN). PSTN interfacing by a call processing platform may be provided as a VoIP connection to the PSTN and/or as POTS trunking. Call processing platforms may provide for data sharing, aggregation, and/or analysis across multiple facilities served.

33 Claims, 5 Drawing Sheets

U.S. PATENT DOCUMENTS

| | | |
|---|---|---|
| 3,952,160 A | 4/1976 | Pasternack et al. |
| 3,985,956 A | 10/1976 | Monti et al. |
| 3,997,731 A | 12/1976 | Wilmot et al. |
| 4,001,513 A | 1/1977 | Naylor |
| 4,002,848 A | 1/1977 | Stein |
| 4,027,109 A | 5/1977 | Smith et al. |
| 4,054,756 A | 10/1977 | Comella et al. |
| 4,055,730 A | 10/1977 | Stapleford et al. |
| 4,122,308 A | 10/1978 | Weinberger et al. |
| 4,156,799 A | 5/1979 | Cave |
| 4,188,508 A | 2/1980 | Rogers et al. |
| 4,196,317 A | 4/1980 | Bartelink |
| 4,310,726 A | 1/1982 | Asmuth |
| 4,319,091 A | 3/1982 | Meri |
| 4,326,123 A | 4/1982 | Hosterman |
| 4,333,056 A | 6/1982 | Cave |
| 4,371,752 A | 2/1983 | Matthews et al. |
| 4,387,274 A | 6/1983 | Stein et al. |
| 4,405,833 A | 9/1983 | Cave et al. |
| 4,439,636 A | 3/1984 | Newkirk et al. |
| 4,445,211 A | 4/1984 | Webber |
| 4,477,698 A | 10/1984 | Szlam et al. |
| 4,518,825 A | 5/1985 | Brinkerhoff et al. |
| 4,538,030 A | 8/1985 | Fossett et al. |
| 4,540,855 A | 9/1985 | Szlam et al. |
| 4,552,996 A | 11/1985 | de Bergh |
| 4,559,416 A | 12/1985 | Theis et al. |
| 4,585,904 A | 4/1986 | Mincone et al. |
| 4,593,157 A | 6/1986 | Usdan |
| 4,595,983 A | 6/1986 | Gehalo et al. |
| 4,602,129 A | 7/1986 | Matthews et al. |
| 4,626,630 A | 12/1986 | Waldman |
| 4,629,829 A | 12/1986 | Puhl et al. |
| 4,644,109 A | 2/1987 | Takeda et al. |
| 4,686,699 A | 8/1987 | Wilkie |
| 4,696,028 A | 9/1987 | Morganstein et al. |
| 4,696,031 A | 9/1987 | Freudberg et al. |
| 4,698,840 A | 10/1987 | Dively et al. |
| 4,712,230 A | 12/1987 | Rice et al. |
| 4,723,273 A | 2/1988 | Diesel et al. |
| 4,726,057 A | 2/1988 | Doerry et al. |
| 4,727,577 A | 2/1988 | Frey et al. |
| 4,731,818 A | 3/1988 | Clark, Jr. et al. |
| 4,736,405 A | 4/1988 | Akiyama |
| 4,737,982 A | 4/1988 | Boratgis et al. |
| 4,746,786 A | 5/1988 | Heberle et al. |
| 4,763,350 A | 8/1988 | Immendorfer et al. |
| 4,766,604 A | 8/1988 | Axberg |
| 4,768,223 A | 8/1988 | Kinoshita et al. |
| 4,768,227 A | 8/1988 | Dively et al. |
| 4,769,834 A | 9/1988 | Billinger et al. |
| 4,777,647 A | 10/1988 | Smith et al. |
| 4,782,516 A | 11/1988 | Maybach et al. |
| 4,791,640 A | 12/1988 | Sand |
| 4,794,642 A | 12/1988 | Arbazadah et al. |
| 4,797,910 A | 1/1989 | Daudelin |
| 4,799,255 A | 1/1989 | Billinger et al. |
| 4,802,207 A | 1/1989 | Uchida |
| 4,803,718 A | 2/1989 | Neil et al. |
| 4,815,120 A | 3/1989 | Kosich |
| 4,825,460 A | 4/1989 | Carter et al. |
| 4,839,917 A | 6/1989 | Oliver |
| 4,850,011 A | 7/1989 | Delmege et al. |
| 4,868,873 A | 9/1989 | Kamil |
| 4,885,765 A | 12/1989 | Shirakawa |
| 4,890,317 A | 12/1989 | Hird et al. |
| 4,896,348 A | 1/1990 | Grantland et al. |
| 4,899,358 A | 2/1990 | Blakley |
| 4,899,375 A | 2/1990 | Bauer et al. |
| 4,901,341 A | 2/1990 | Carter et al. |
| 4,908,852 A | 3/1990 | Hird et al. |
| 4,916,733 A | 4/1990 | Smith et al. |
| 4,920,562 A | 4/1990 | Hird et al. |
| 4,922,519 A | 5/1990 | Daudelin |
| 4,922,520 A | 5/1990 | Bernard et al. |
| 4,924,488 A | 5/1990 | Kosich |
| 4,924,501 A | 5/1990 | Cheeseman et al. |
| 4,932,062 A | 6/1990 | Hamilton |
| 4,933,966 A | 6/1990 | Hird et al. |
| 4,933,967 A | 6/1990 | Lo et al. |
| 4,935,956 A | 6/1990 | Hellwarth et al. |
| 4,937,856 A | 6/1990 | Natarajan |
| 4,937,862 A | 6/1990 | Kosich |
| 4,943,995 A | 7/1990 | Daudelin et al. |
| 4,944,001 A | 7/1990 | Kizuik et al. |
| 4,947,422 A | 8/1990 | Smith et al. |
| 4,947,425 A | 8/1990 | Grizmala et al. |
| 4,979,214 A | 12/1990 | Hamilton |
| 4,991,203 A | 2/1991 | Kakizawa |
| 4,993,062 A | 2/1991 | Dula et al. |
| 4,993,068 A | 2/1991 | Piosenka et al. |
| 5,003,595 A | 3/1991 | Collins et al. |
| 5,008,923 A | 4/1991 | Kitamura et al. |
| 5,020,095 A | 5/1991 | Morganstein et al. |
| 5,022,067 A | 6/1991 | Hughes |
| 5,023,869 A | 6/1991 | Grover et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,093,858 A | 3/1992 | Hird et al. |
| 5,109,405 A | 4/1992 | Morganstein |
| 5,131,024 A | 7/1992 | Pugh et al. |
| 5,134,651 A | 7/1992 | Ortiz et al. |
| 5,150,357 A | 9/1992 | Hopner et al. |
| 5,153,907 A | 10/1992 | Pugh et al. |
| 5,155,761 A | 10/1992 | Hammond |
| 5,163,083 A | 11/1992 | Dowden et al. |
| 5,164,989 A | 11/1992 | Brandman et al. |
| 5,181,237 A | 1/1993 | Dowden et al. |
| 5,187,740 A | 2/1993 | Swaim et al. |
| 5,193,110 A | 3/1993 | Jones et al. |
| 5,200,995 A | 4/1993 | Gaukel et al. |
| 5,210,789 A | 5/1993 | Jeffus et al. |
| 5,216,702 A | 6/1993 | Ramsden |
| 5,218,636 A | 6/1993 | Hamilton |
| 5,220,501 A | 6/1993 | Lawlor et al. |
| 5,222,120 A | 6/1993 | McLeod et al. |
| 5,229,764 A | 7/1993 | Matchett et al. |
| 5,247,569 A | 9/1993 | Cave |
| 5,255,305 A | 10/1993 | Sattar |
| 5,274,698 A | 12/1993 | Jang |
| 5,276,731 A | 1/1994 | Arbel et al. |
| 5,283,825 A | 2/1994 | Druckman et al. |
| 5,283,829 A | 2/1994 | Anderson |
| 5,287,401 A | 2/1994 | Lin |
| 5,305,312 A | 4/1994 | Fornek et al. |
| 5,309,505 A | 5/1994 | Szlam et al. |
| 5,311,589 A | 5/1994 | Bennett et al. |
| 5,319,701 A | 6/1994 | Hird et al. |
| 5,319,702 A | 6/1994 | Kitchin et al. |
| 5,321,754 A | 6/1994 | Fisher et al. |
| 5,323,448 A | 6/1994 | Biggs et al. |
| 5,325,421 A | 6/1994 | Hou et al. |
| 5,325,427 A | 6/1994 | Dighe |
| 5,327,489 A | 7/1994 | Anderson et al. |
| 5,329,578 A | 7/1994 | Brennan et al. |
| 5,333,181 A | 7/1994 | Biggs |
| 5,335,266 A | 8/1994 | Richardson, Jr. et al. |
| 5,345,501 A | 9/1994 | Shelton |
| 5,345,595 A | 9/1994 | Johnson et al. |
| 5,351,285 A | 9/1994 | Katz |
| 5,351,287 A | 9/1994 | Bhattacharyya et al. |
| 5,355,403 A | 10/1994 | Richardson, Jr. et al. |
| 5,369,699 A | 11/1994 | Page et al. |
| 5,375,161 A | 12/1994 | Fuller et al. |
| 5,381,474 A | 1/1995 | Lahdemaki et al. |
| 5,394,465 A | 2/1995 | Jo |
| 5,416,831 A | 5/1995 | Chewning, III et al. |
| 5,425,087 A | 6/1995 | Gerber et al. |
| 5,428,662 A | 6/1995 | Hamilton |
| 5,442,696 A | 8/1995 | Lindberg et al. |
| 5,450,485 A | 9/1995 | Hamilton |
| 5,452,347 A | 9/1995 | Iglehart et al. |
| 5,455,819 A | 10/1995 | Sugiyama |
| 5,461,665 A | 10/1995 | Shur et al. |
| 5,465,293 A | 11/1995 | Chiller et al. |

| | | | |
|---|---|---|---|
| 5,465,387 A | 11/1995 | Mukherjee | |
| 5,471,519 A | 11/1995 | Howe et al. | |
| 5,473,686 A | 12/1995 | Virdee | |
| 5,483,582 A | 1/1996 | Pugh et al. | |
| 5,483,593 A | 1/1996 | Gupta et al. | |
| 5,485,507 A | 1/1996 | Brown et al. | |
| 5,497,414 A | 3/1996 | Bartholomew | |
| 5,504,810 A * | 4/1996 | McNair | 379/189 |
| 5,524,141 A | 6/1996 | Braun et al. | |
| 5,524,145 A | 6/1996 | Parker | |
| 5,535,261 A | 7/1996 | Brown et al. | |
| 5,539,812 A | 7/1996 | Kitchin et al. | |
| 5,544,231 A | 8/1996 | Cho | |
| 5,566,229 A | 10/1996 | Hou et al. | |
| 5,577,116 A | 11/1996 | Townsend et al. | |
| 5,583,920 A | 12/1996 | Wheeler, Jr. | |
| 5,583,934 A | 12/1996 | Zhou | |
| 5,606,604 A | 2/1997 | Rosenblatt et al. | |
| 5,617,471 A | 4/1997 | Rogers et al. | |
| 5,619,561 A | 4/1997 | Reese | |
| 5,627,887 A | 5/1997 | Freedman | |
| 5,634,126 A | 5/1997 | Norell | |
| 5,651,056 A | 7/1997 | Eting et al. | |
| 5,655,013 A * | 8/1997 | Gainsboro | 379/188 |
| 5,682,386 A * | 10/1997 | Arimilli et al. | 370/468 |
| 5,722,418 A | 3/1998 | Bro | |
| 5,724,404 A | 3/1998 | Garcia et al. | |
| 5,742,905 A | 4/1998 | Pepe et al. | |
| 5,745,553 A | 4/1998 | Mirville et al. | |
| 5,745,558 A | 4/1998 | Richardson, Jr. et al. | |
| 5,757,781 A | 5/1998 | Gilman et al. | |
| 5,768,355 A | 6/1998 | Salibrici et al. | |
| 5,777,558 A | 7/1998 | Pennypacker et al. | |
| 5,796,811 A | 8/1998 | McFarlen | |
| 5,799,068 A | 8/1998 | Kikinis et al. | |
| 5,805,685 A | 9/1998 | McFarlen | |
| 5,809,125 A | 9/1998 | Gammino | |
| 5,844,978 A | 12/1998 | Reuss et al. | |
| 5,859,907 A | 1/1999 | Kawahara et al. | |
| 5,862,519 A | 1/1999 | Sharma et al. | |
| 5,867,559 A | 2/1999 | Jorgensen et al. | |
| 5,875,230 A | 2/1999 | Ganley et al. | |
| 5,883,945 A | 3/1999 | Richardson, Jr. et al. | |
| 5,907,602 A | 5/1999 | Peel et al. | |
| 5,923,746 A | 7/1999 | Baker et al. | |
| 5,926,533 A | 7/1999 | Gainsboro | |
| 5,937,042 A | 8/1999 | Sofman | |
| 5,943,403 A | 8/1999 | Richardson, Jr. et al. | |
| 5,946,386 A | 8/1999 | Rogers et al. | |
| 5,960,064 A | 9/1999 | Foladare et al. | |
| 6,031,895 A | 2/2000 | Cohn et al. | |
| 6,052,454 A | 4/2000 | Kek et al. | |
| 6,064,963 A | 5/2000 | Gainsboro | |
| 6,072,860 A | 6/2000 | Kek et al. | |
| 6,075,843 A | 6/2000 | Cave | |
| 6,097,804 A | 8/2000 | Gilbert et al. | |
| 6,134,320 A | 10/2000 | Swan et al. | |
| 6,141,406 A | 10/2000 | Johnson | |
| 6,169,789 B1 | 1/2001 | Rao et al. | |
| RE37,073 E | 2/2001 | Hammond | |
| 6,188,751 B1 | 2/2001 | Scherer | |
| 6,249,570 B1 | 6/2001 | Glowny et al. | |
| 6,320,946 B1 | 11/2001 | Enzmann et al. | |
| 6,320,948 B1 * | 11/2001 | Heilmann et al. | 379/189 |
| 6,324,280 B2 | 11/2001 | Dunn et al. | |
| 6,363,065 B1 | 3/2002 | Thornton et al. | |
| 6,366,653 B1 | 4/2002 | Yeh et al. | |
| 6,381,321 B1 | 4/2002 | Brown et al. | |
| 6,404,764 B1 | 6/2002 | Jones et al. | |
| 6,404,857 B1 | 6/2002 | Blair et al. | |
| 6,404,870 B1 | 6/2002 | Kia | |
| 6,445,682 B1 | 9/2002 | Weitz | |
| 6,480,590 B1 | 11/2002 | Ku | |
| 6,487,200 B1 | 11/2002 | Fraser | |
| 6,496,477 B1 | 12/2002 | Perkins et al. | |
| 6,529,500 B1 | 3/2003 | Pandharipande | |
| 6,529,602 B1 | 3/2003 | Walker et al. | |
| 6,553,336 B1 | 4/2003 | Johnson et al. | |
| 6,560,323 B2 | 5/2003 | Gainsboro | |
| 6,560,325 B2 | 5/2003 | Brown et al. | |
| 6,611,583 B1 | 8/2003 | Gainsboro | |
| 6,621,812 B1 * | 9/2003 | Chapman et al. | 370/346 |
| 6,654,722 B1 * | 11/2003 | Aldous et al. | 704/270.1 |
| 6,665,380 B1 | 12/2003 | Cree et al. | |
| 6,687,360 B2 | 2/2004 | Kung et al. | |
| 6,731,630 B1 | 5/2004 | Schuster et al. | |
| 6,788,775 B1 * | 9/2004 | Simpson | 379/207.13 |
| 6,795,444 B1 | 9/2004 | Vo et al. | |
| 6,816,469 B1 | 11/2004 | Kung et al. | |
| 6,876,647 B2 | 4/2005 | Celi, Jr. | |
| 6,904,139 B2 | 6/2005 | Brown et al. | |
| 6,920,209 B1 | 7/2005 | Gainsboro | |
| 6,985,478 B2 * | 1/2006 | Pogossiants et al. | 370/352 |
| 7,039,171 B2 | 5/2006 | Gickler | |
| 7,042,992 B1 | 5/2006 | Falcone et al. | |
| 7,046,782 B2 | 5/2006 | Miller | |
| 7,085,359 B2 | 8/2006 | Crites et al. | |
| 7,302,053 B2 | 11/2007 | Chang et al. | |
| 7,333,798 B2 | 2/2008 | Hodge | |
| 7,360,087 B2 | 4/2008 | Jorgensen et al. | |
| 7,360,090 B1 | 4/2008 | Doskow et al. | |
| 7,505,406 B1 * | 3/2009 | Spadaro et al. | 370/230.1 |
| 2001/0028649 A1 | 10/2001 | Pogossiants et al. | |
| 2001/0036821 A1 | 11/2001 | Gainsboro et al. | |
| 2001/0041590 A1 | 11/2001 | Silberfenig et al. | |
| 2001/0047333 A1 * | 11/2001 | Kim et al. | 705/40 |
| 2002/0071537 A1 | 6/2002 | Gainsboro | |
| 2002/0141386 A1 | 10/2002 | Minert et al. | |
| 2002/0159440 A1 * | 10/2002 | Mussman et al. | 370/352 |
| 2002/0176403 A1 | 11/2002 | Radian | |
| 2003/0002639 A1 | 1/2003 | Huie | |
| 2003/0023714 A1 | 1/2003 | Ziegler et al. | |
| 2003/0091028 A1 | 5/2003 | Chang et al. | |
| 2003/0126470 A1 | 7/2003 | Crites et al. | |
| 2003/0133558 A1 | 7/2003 | Kung et al. | |
| 2003/0185204 A1 | 10/2003 | Murdock | |
| 2004/0052218 A1 | 3/2004 | Knappe | |
| 2006/0209797 A1 * | 9/2006 | Anisimov et al. | 370/352 |
| 2006/0285650 A1 | 12/2006 | Hodge | |
| 2006/0286962 A1 | 12/2006 | Davis | |
| 2007/0041545 A1 | 2/2007 | Gainsboro | |
| 2007/0071206 A1 | 3/2007 | Gainsboro et al. | |
| 2007/0115924 A1 | 5/2007 | Schneider et al. | |
| 2007/0242658 A1 | 10/2007 | Rae et al. | |
| 2007/0263812 A1 | 11/2007 | Polozola et al. | |
| 2008/0040780 A1 | 2/2008 | Reinhold | |

FOREIGN PATENT DOCUMENTS

| | | |
|---|---|---|
| EP | 0814583 A2 | 12/1997 |
| EP | 1 175 074 | 1/2002 |
| FR | 2600850 | 12/1987 |
| GB | 2134749 A | 8/1984 |
| JP | 5-30193 | 2/1993 |
| JP | 63-03305 | 10/1994 |
| JP | 63-033054 | 12/1994 |
| JP | 2002157627 | 5/2002 |
| JP | 2003110758 | 4/2003 |
| WO | WO 96/20448 A1 | 7/1996 |
| WO | WO 97/22208 A2 | 6/1997 |
| WO | WO 98/13993 A1 | 4/1998 |
| WO | WO 00/54491 A1 | 9/2000 |

OTHER PUBLICATIONS

"Call Control—Commander II", SciDyn Products, [online] [Retrieved on Nov. 4, 2005] Retrieved from http//:www.scidyn.com/products/commander2.html.

"Smart Features for Optimizing Your Network", SciDyn BubbleLink, [online] [Retrieved on Nov. 4, 2005] Retrieved from: http://www.scidyn.com/products/bubble.html.

"BubbleLINK® Software Architecture", SciDyn™, The Voice of IP Technology™, [online] [Retrieved on Nov. 4, 2005] Retrieved from: http://www.scidyn.com/products/BubbleLink%20White.pdf.

"ShoreTel- Intelligent Phone Systems", ShoreTel, [online] [Retrieved on Nov. 4, 2005] Retrieved from: http://www.shoretel.com/STCorp/products/architecture.aspx.

Bobb Swope, et al., U.S. Appl. No. 09/640,831, Entitled "System and Method for Reverse Billing for Telephone Call," filed Aug. 17, 2000.

Michael Lord, U.S. Appl. No. 09/955,253, Entitled "Method and Apparatus for Exchanging Data Between a Primary Computer System to Ensure Transactional Reconciliation Between the Systems," filed Nov. 27, 2001.

Nadia Draizin, et al., U.S. Appl. No. 10/022,946, Entitled "A Method for Determining an Entity Responsible for Billing a Called Party," filed Dec. 17, 2001.

John J. Viola, et al., U.S. Appl. No. 10/135,878, Entitled "Information Management and Movement System and Method," filed Apr. 29, 2002.

Richard Falcone, et al., U.S. Appl. No. 10/190,315, Entitled "Systems and Methods for Offering a Service to a Party Associated with a Blocked Call," filed Jul. 3, 2002.

Michael Lord, U.S. Appl. No. 10/252,956, Entitled "Three-Way Telephone Call Prevention System and Method," filed Sep. 20, 2002.

Dick Falcone, et al., U.S. Appl. No. 10/135,883, Entitled "Optimizing Profitability in Business Transactions," filed Nov. 25, 2003.

Marc Hite, et al., U.S. Appl. No. 10/437,839, Entitled "Intelligent Queuing of Transaction Records," filed May 14, 2003.

Richard Falcone, et al., U.S. Appl. No. 10/360,248, Entitled "Systems and Methods for Account Establishment and Transaction Management Using Interrupt Messaging," filed Feb. 7, 2003.

Richard Falcone, et al., U.S. Appl. No. 10/360,442, Entitled "Systems and Methods for Transaction Authorization Determination," filed Feb. 7, 2003.

Anderson, Susan, "Three-Way Call Detect . . . Close Enough to Perfect?" Correctional Communications Quarterly, pp. 16-20, Oct. 1993.

Bahl, L. "A Maximum Likelihood Approach to Continuous Speech Recovery," Readings in Speech Recognition, Ed. A. Waibel and K. Lee, Morgan Kaufmann Publishers, pp. 308-319, IEEE 1983.

Batten, A. "Personal Communications Service and the Intelligent Network," British Telecommunications Engineering, vol. 9, pp. 88-91, Aug. 1990.

DPD/120-JP Product on Display at Communications Tokyo '01, Apr. 2-5, 1991 (Product described in U.S. Patent No. 5,218,636).

European Examination Report, EP07251570.3, May 29, 2008, 5 pages.

Exhibits A-N, Various materials compiled by Applicants.

HR Solutions, http://www.solutions.hrd.com/methods_of_electronic_monitoring.htm, p. 4 of 5, Telephone Surveillance.

Jones International, http://www.jonesencyclo.com/encyclo/update/ecpa.html, 1-7, Electronic Communications Privacy Act.

LazerVoice, Digital Recording System Inmate Services, 1997-1998, Schlumberger Technologies, Inc. / LazerVoice STIL V0222 LazerVoice User's Manual—Version 2.22, pp. 1-41, published Apr. 28, 1998 by Schlumberger Technologies, Inc./LazerVoice of Mobile, Alabama.

"LazerPhone User Reference Manual," 150 pages, edition and publisher unknown.

"LazerPhone Inmate Telephone System, Users Manual version 1.0," pp. 1-29, published Oct. 1998 by Schlumberger Technologies, Inc./Global Tel*Link of Mobile, Alabama.

LazerPhone, Powerful Performance Uncompromising Standards, 1998.

LazerPhone Technical Manual, "Chapter I. System Overview," pp. 1.1-1.6, published by Schlumberger Technologies, Inc. of Mobile, Alabama.

Lee, K., "Large-Vocabulary Speaker-Independent Continuous Speech Recognition Using HMM," Carnegie Mellon University Department of Electrical and Computer Engineering, CMU-CS-88-148, Apr. 1988.

Manual for "DPD/120-JP Dial Pulse Detection Board," Dialogic Systems Ltd., Tokyo, Japan, (Product described in U.S. Patent No. 5,218,636), undated.

OSSGR, vol. 3, "Feature Specific Documents," Technical Ref. TSY-000271 FSD 85-01-0100 Calling Card Service—Published by Bell Communications Research-Revision #3, Dated Mar. 1988.

OSSGR, vol. 3, "Feature Specific Documents," Technical Ref. TSY-000271 FSD-85-01-0200 Collect Billing—Published by Bell Communications Research-Revision #3 Dated Mar. 1988.

PCT International Search Report, PCT/US99/09493, Aug. 20, 1999, 5 pages.

PCT Written Opinion, PCT/US99/09493, Feb. 9, 2000, 12 pages.

"PPCS (Prison Prepaid Card System)", DiaVox Technologies, Inc., Nov. 2000, 10 pages.

Scidyn Commander 3-Way Call Detection System [online] [Retrieved on Jun. 20, 2006] Retrieved from: http://www.scidyn.com/products/Commander%203-way%20Detection.pdf, 5 pages.

"System 20" Value Added Communications (VAC), Nov. 1992, Brochure (4 pages).

Telematic "ConQuest III Inmate Telephone System," Nov. 1992.

Thermos, P., "Two Attacks Against VoIP," Security Focus, XP-002444627, Ap. 4, 2006, pp. 1-8.

U.S. Appl. No. 09/229,385, Cree et al., filed Jan. 1999.

U.S. Appl. No. 09/905,014, Spadaro et al., Entitled "Public Telephone Control with Voice Over Internet Protocol Transmission," filed Jul. 13, 2001.

U.S. Appl. No. 10/420,585, McNitt et al., Entitled "System and Method for Detecting Unauthorized Call Activity,".

U.S. Appl. No. 10/642,532, Rae et al., Entitled "Centralized Cell Processing," filed Aug. 15, 2003.

U.S. Appl. No. 10/646,638, filed Aug. 22, 2003.

U.S. Appl. No. 11/777,168, Rae et al., Entitled "Inmate Management and Call Processing Systems and Methods," filed Jul. 12, 2007.

U.S. Appl. No. 11/403,547, filed Apr. 13, 2006.

"VoIP the Evolving Solution and the Evolving Threat," Internet Security Systems, Inc., XP-002444626, 2004, pp. 1-7.

United States Office Action, U.S. Appl. No. 09/905,014, Apr. 19, 2005, 19 pages.

United States Office Action, U.S. Appl. No. 09/905,014, Jan. 9, 2006, 22 pages.

United States Office Action, U.S. Appl. No. 09/905,014, Sep. 14, 2006, 23 pages.

United States Office Action, U.S. Appl. No. 09/905,014, Mar. 22, 2007, 25 pages.

United States Office Action, U.S. Appl. No. 09/905,014, Sep. 12, 2007, 29 pages.

United States Office Action, U.S. Appl. No. 09/905,014, Mar. 17, 2008, 27 pages.

United States Office Action, U.S. Appl. No. 10/642,532, Mar. 20, 2008, 26 pages.

United States Office Action, U.S. Appl. No. 10/642,532, Nov. 7, 2008, 16 pages.

United States Office Action, U.S. Appl. No. 10/642,532, Feb. 23, 2009, 15 pages.

United States Office Action, U.S. Appl. No. 10/642,532, Sep. 9, 2009, 18 pages.

United States Office Action, U.S. Appl. No. 11/777,168, Apr. 8, 2008, 12 pages.

United States Office Action, U.S. Appl. No. 11/777,168, Oct. 29, 2008, 5 pages.

United States Office Action, U.S. Appl. No. 11/777,168, Nov. 20, 2008, 5 pages.

United States Office Action, U.S. Appl. No. 10/642,532, Jan. 6, 2010, 17 pages.

United States Office Action, U.S. Appl. No. 11/403,547, Dec. 30, 2009, 5 pages.

* cited by examiner

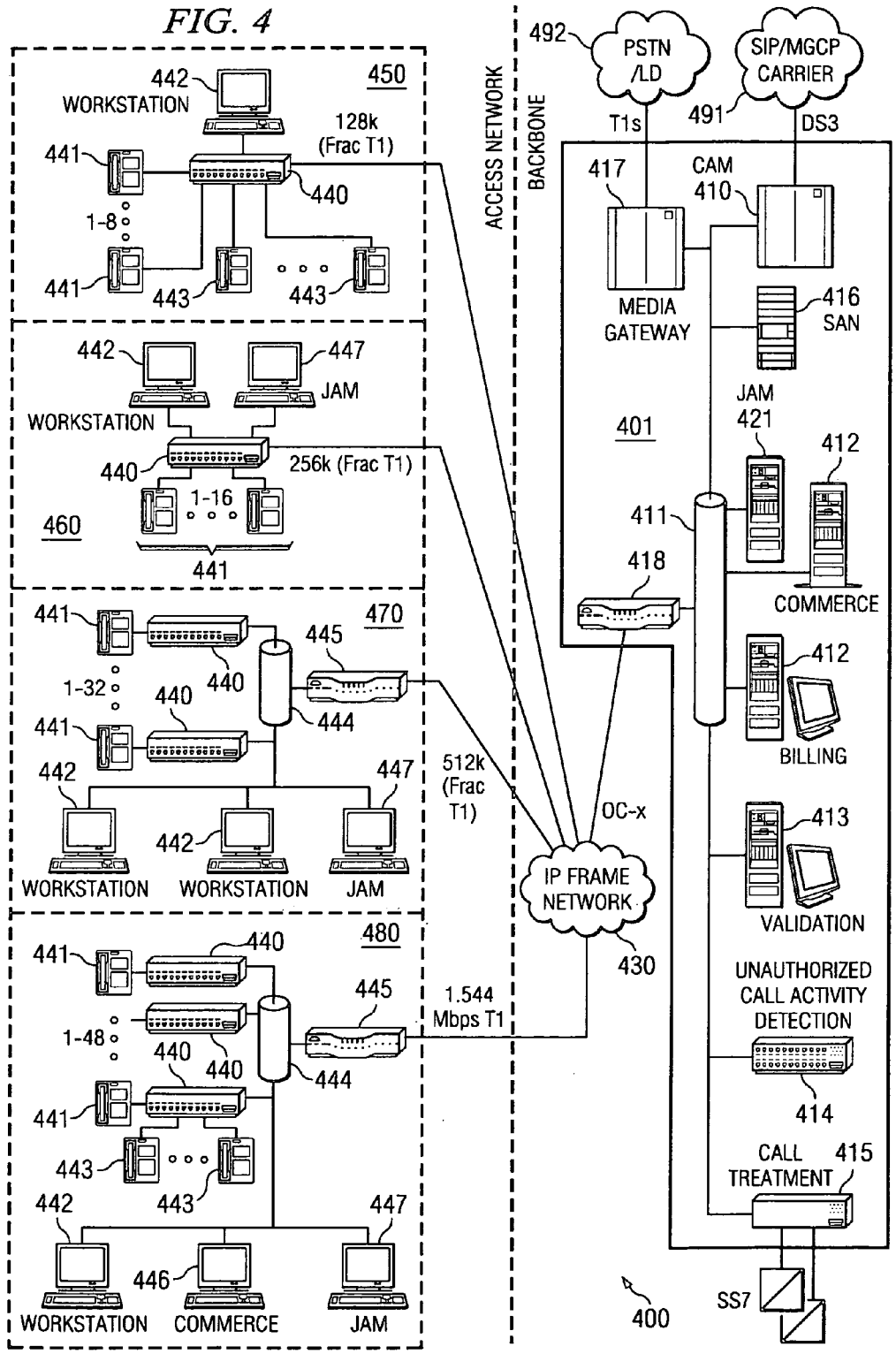

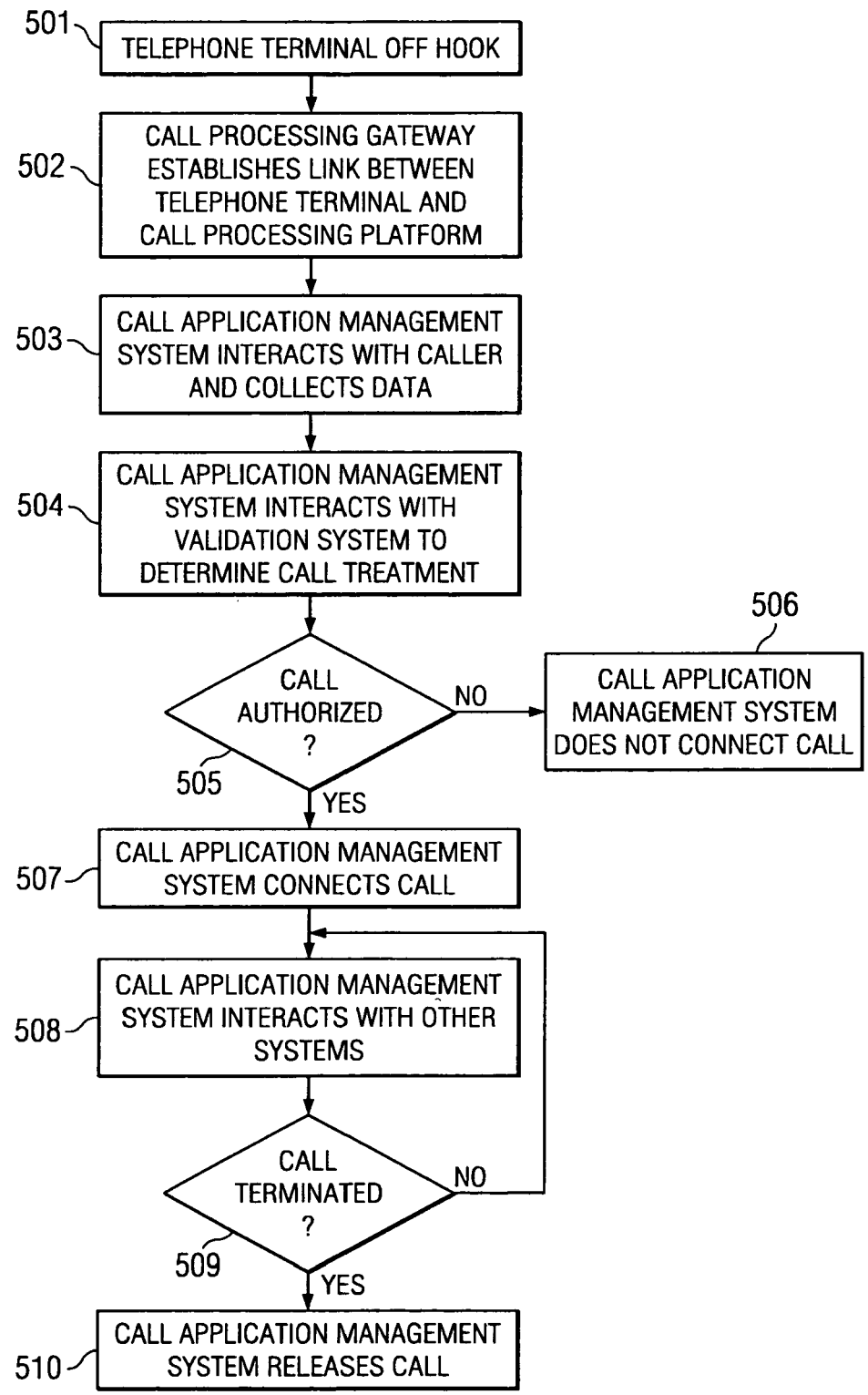

CALL PROCESSING WITH VOICE OVER INTERNET PROTOCOL TRANSMISSION

CROSS-REFERENCE TO RELATED APPLICATIONS

The present application is a continuation-in-part of co-pending and commonly assigned U.S. patent application Ser. No. 09/905,014 entitled "Public Telephone Control with Voice Over Internet Protocol Transmission," filed Jul. 13, 2001, and is a continuation-in-part of co-pending and commonly assigned U.S. patent application Ser. No. 10/642,532 entitled "Centralized Voice Processing," filed Aug. 15, 2003, the disclosures of which are hereby incorporated herein by reference. The present application is related to co-pending and commonly assigned U.S. patent application Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/190,315 entitled "System and Methods for Offering a Service to a Party Associated with a Blocked Call," filed Jul. 3, 2002, Ser. No. 09/640,831 entitled "System and Method for Reverse Billing of a Telephone Call," filed Aug. 17, 2000, Ser. No. 10/022,946 entitled "Method for Determining an Entity Responsible for Billing a Called Party," filed Dec. 17, 2001, Ser. No. 10/217,149 entitled "System and Method for Call Treatment," filed Aug. 12, 2002, Ser. No. 10/252,956 entitled "Three-Way Telephone Call Prevention System and Method," filed Sep. 20, 2002, Ser. No. 09/995,253 entitled "Method and Apparatus for Exchanging Data Between a Primary Computer System and an External Computer System to Ensure Transaction Reconciliation Between the Systems," filed Nov. 27, 2001, Ser. No. 10/360,248 entitled "System and Method for Account Establishment and Transaction Management Using Interrupt Messaging," filed Feb. 7, 2003, Ser. No. 10/360,442 entitled "Systems and Methods for Transaction Authorization Determination," filed Feb. 7, 2003, Ser. No. 10/437,839 entitled "Intelligent Queuing of Transaction Requests," filed May 14, 2003, and Ser. No. 10/420,585 entitled "System and Method for Detecting Unauthorized Call Activity," filed Apr. 22, 2003, the disclosures of which are hereby incorporated herein by reference.

TECHNICAL FIELD

This invention relates generally to call processing systems, and more particularly, to a call processing architecture providing processing of voice telephone calls with the calls being routed over Voice over Internet Protocol networks.

BACKGROUND OF THE INVENTION

With typical coin operated public telephones a caller manually dials appropriate information over transmission means, such as local wire loops connecting to a computing and switching means called a "central office switch," which first collects the dialed caller information, processes the call, and controls the switching, accessing, and routing of caller information over long-distance transmission means to other similarly-arranged computing and switching means that are remotely located. Access over additional long-distance transmission means was provided to a last computing and switching means connected to the local loop of a destination telephone terminal instrument and various computing and switching means which record the call numbers and timing and further arrange the accounting and billing for the public telephones and calls.

In the past voice telephone calls were connected to a human operator to provide assistance in accounting and billing for a call. However, automated systems for providing call processing functions are not new. For example, U.S. Pat. No. 5,247,569 entitled "System and Method for Controlling Outbound and Inbound Calls in a Telephone Communication System," the disclosure of which is incorporated herein by reference, teaches a call handling system for controlling inbound and outbound calls automatically for placing agents in communication with calling and called parties. U.S. Pat. No. 5,255,305 entitled "Integrated Voice Processing System," the disclosure of which is incorporated herein by reference, teaches a general purpose computer platform providing voice processing functions, including voice messaging, call processing, and interactive voice response. U.S. Pat. No. 4,935,956 entitled "Automated Public Phone Control for Charge and Collect Billing," the disclosure of which is incorporated herein by reference, teaches a microcomputer system for use in automatically controlling charge and collect-call functions, wherein the charges can be billed to either a credit account, the called party, or to a third party with a computer recording and accounting for the revenues collected from the telephone service. U.S. Pat. No. 6,052,454 entitled "Telephone Apparatus With Recording of Phone Conversations on Massive Storage," the disclosure of which is incorporated herein by reference, teaches a telephone apparatus for providing service to a plurality of telephones located at a particular facility, having the capability of controlling the connection of calls and recording selected phone conversations.

Such call processing systems have typically implemented configurations in which substantial amounts of call processing functionality is disposed or deployed in association with a facility being serviced. For example, discrete and substantially independent call processing systems are disposed at prison facilities, or other facilities, served by the system of above mentioned U.S. Pat. No. 4,935,956. Similarly, although call authorization functionality is disposed remotely to a facility being served in the system of above mentioned U.S. Pat. No. 6,052,454, call processing is provided by the phone system disposed at the facility.

A service provider may have a relatively large number of facilities for which calling services are provided, such as on the order of hundreds or even thousands of individual facilities, perhaps distributed throughout a large geographic area. The aforementioned locally disposed call processing systems provide a number of disadvantages in addition to the equipment costs associated with such a configuration. For example, a large number of call processing systems, particularly when distributed throughout a large geographic area, presents challenges from a maintenance standpoint. When system aspects are modified or updated, such as to provide new rate tables or dialing area codes, each such call processor requires individual attention. For example, an operations, administration, maintenance, and provisioning (OAM&P) terminal may be utilized to establish a dial-up connection with each affected call processor and provide update information and/or reconfiguration. However, merely establishing such dial-up connections with a large number of remote systems is burdensome, even ignoring the time and effort required in actually providing the update. Even where a persistent data link is maintained between such an OAM&P terminal and the remote systems, managing an update of a large number of remote systems is difficult.

Additionally, data sharing, aggregation, and statistical analysis available using such discrete or distributed call processing systems is very limited. The distributed and discrete nature of such previous configurations is not well suited for widespread data sharing, aggregation, and analysis. Moreover, the lack of persistent and/or high bandwidth data connections, such as in the case of the typical dial-up configuration, does not readily facilitate the aggregation of large amounts of data as might otherwise be useful in developing an image across many facilities for which calling services are provided.

Introducing new features and functions in such call processing systems can be problematic. For example, a particular feature requiring a minimum resource configuration or particular hardware may require a significant capital investment to introduce the feature for use at a number of sites as each corresponding call processing system may require hardware upgrades etcetera.

Additional challenges may be presented with respect to use of the aforementioned discrete or distributed call processing systems in particular situations. For example, where such call processing systems are deployed for use with respect to particular controlled environment facilities, such as prison facilities, functionality such as call recording may be implemented. Recording calls typically require substantial recording media space. Accordingly, personnel at each facility, whether employed by the service provider or by the facility itself, is required to periodically, often daily, archive or otherwise refresh the recording media to ensure the continued ability to record calls.

Where such call processing systems are used in providing collect calling or other subsequently billed calling services, discrete or distributed call processing system configurations can present issues with respect to billing and/or risk management. For example, billing records may only be polled periodically, such as by establishing a dial-up connection every night, thereby delaying billing as much as 24 hours with respect to any particular call. Moreover, analysis with respect to call velocity (information with respect to a number of calls placed to or from a particular number over a period of time) and/or credit limits may not be possible until the aforementioned periodic collection of data, allowing calls which otherwise would not be allowed to be completed to continue to be placed during the time of a polling period.

Telephone instruments which are accessible to the public for placing telephone calls are used in locations which are accessible to persons who are not necessarily responsible for their use. Often, public telephones are located in areas where restrictions are to be placed on their use. For example, in prisons limitations are placed on the destination telephones (called party numbers) which may be called. In order to control the destination numbers which may be called using such publicly placed telephone instruments, it is useful to detect three-way call attempts which may be used to circumvent destination number restrictions imposed by a call processor. U.S. Pat. No. 5,768,355 entitled "Three-Way Call Detection System," the disclosure of which is incorporated herein by reference, shows a three-way call detection system which uses digital signal processing to identify a third party connection. The three-way call detection of this patent is used in the Commander™ telephone system supplied by Science Dynamics Corporation.

Recently, voice over internet protocol (VoIP) has been used for transmitting packets of data representing voice telephone messages. A VoIP gateway provides an interface between analog voice lines and digital data systems and permits VoIP sessions to be conducted with called parties, such as a called party having a personal computer (PC) connected to the public switched telephone network (PSTN) by a telephone line.

BRIEF SUMMARY OF THE INVENTION

The present invention is directed to systems and methods which provide a call processing architecture in which call control functions are centralized or distributed using network connections, such as those of an intranet and/or the Internet. According to embodiments of the invention, telephone instruments disposed at a location at which calling services are provided are selectively connected to an off site switched telephone network over a VoIP network. In accordance with embodiments of the invention, the distribution of call processing functions to remote locations is integrated with the distribution of telephony signals over the VoIP network. According to preferred embodiments, three-way call detection processing is disposed beyond or outside of the VoIP network so that signal loss or degradation by VoIP does not interfere with three-way call detection.

According to a preferred embodiment of the present invention VoIP is utilized to carry calls from a location at which calling services are provided to a centralized call processing platform providing all or substantially all call processing functionality, such as calling party identification, call validation, call routing, connection to the PSTN, call recording, etcetera. High bandwidth persistent data connections provided between locations at which calling services are provided and a centralized call processing platform are utilized not only to carry call content as data, but also to provide persistent data links for data processing use, such as by management terminals and/or other data processing systems (e.g., commerce computer systems, justice application management computer systems, various peripheral devices, etcetera) disposed at the facility locations for which calling services are provided.

Preferred embodiments of the present invention provide devices having relatively limited or specialized functionality, such as VoIP gateways or integrated access devices (IADs) (collectively referred to herein in centralized call processing configurations as call processing gateways), at facility locations for which calling services are provided. These call processing gateways are preferably utilized to provide plain old telephone service (POTS) analog line interfaces for use with a plurality of telephone sets disposed for use at the facility and at least one wide area network (WAN) interface for providing high speed data communication to a centralized call processing platform. The aforementioned WAN interface may provide connectivity via any of a number of networks, including an intranet, an extranet, the Internet, a public network, a private network, and combinations thereof. Call processing gateways utilized according to the present invention may provide additional interfaces, such as a local area network (LAN) for connecting systems such as management terminals to the gateway and/or centralized call processing platform and/or switched network interfaces such as to couple PSTN lines directly to the gateway, if desired.

Call processing gateways of embodiments of the invention become the collection point for calls and data for a particular facility and provide a link to one or more central sites for call processing and other functionality. For example, one centralized call processing platform may be implemented with respect to a plurality of facilities serviced. Additionally or alternatively, a plurality of call processing platforms, such as might be deployed regionally and/or to provide redundancy, may be networked to a plurality of facilities serviced. WAN circuits may be purchased from a carrier for connecting each individual facility to the call processing platform or platforms. The WAN circuits may be purchased according to the bandwidth capacity desired for each corresponding facility, e.g., to provide less bandwidth where few telephone terminals are deployed at a facility and more bandwidth where many telephone terminals are deployed at another facility. The WAN circuits may be collected together as they proceed through a carrier's network, thereby providing a larger aggregate data pipe or pipes at a centralized call processing platform.

Centralized call processing platforms of preferred embodiments of the present invention comprise high capacity and high speed routing/switching functionality, such as a router and gigabit Ethernet switch, to facilitate low latency data communication between call processing functionality and/or PSTN interfacing functionality of the call processing platform and call processing gateways of a plurality of facilities. Call processing functionality of embodiments of a call processing platform may be provided by a plurality of servers operable under control of instruction sets defining operation to provide call processing features such as calling party identification, call validation, call routing, etcetera. PSTN interfacing functionality of embodiments of a call processing platform may be provided as a data connection (e.g., media gateway control protocol (MGCP) or session initiation protocol (SIP)) to the PSTN. Additionally or alternatively, PSTN interfacing functionality of embodiments of a call processing platform may be provided as POTS trunking or other more traditional telephone line interface. Preferred embodiments, however, may place calls on the PSTN in VoIP protocols to receive the benefit of such advantages as lower connection cost offered by the carrier when introduced to the PSTN in VoIP protocols, reduced latencies associated with repeated conversion of the call between VoIP and analog protocols, and improved call quality associated with carrying the call in digital format closer to the called party before conversion back to analog.

Call processing platforms of the present invention may implement interactive voice response (IVR) features, such as to solicit information from a caller, to provide call status announcements, to solicit funds for a call, etcetera. Additionally or alternatively, call processing platforms of the present invention may implement call recording and/or other centralized data collection, such as through use of a storage area network (SAN), interconnected redundant array of inexpensive disks (RAID) or fixed disk platforms, and/or the like.

Preferred embodiment call processing platforms provide for data sharing, aggregation, and/or analysis across multiple facilities served, whether affiliated (such as facilities of a particular city, county, or state or facilities having an association, e.g., sheriff's association) or non-affiliated (such as all facilities served by the service provider). Accordingly, information, such as inmate booking information, dossiers, etcetera, may be shared across facilities.

Similarly, information, such as called party number, uncollectable call statistics, usage frequency or velocity, etcetera, may be aggregated and/or analyzed across facilities.

Call processing platforms of preferred embodiments implement a data structure for segmenting the calling activity for each individual facility to control access with respect to each facility's data and/or to facilitate independent accounting, maintenance, and other functionality, thereby providing, in some respects, a virtual facility call processor with respect to facilities. For example, administrative personnel of a particular facility are preferably enabled to perform maintenance and other operations, e.g., call processor configuration, recorded call playback, billing and commission record access, etcetera, with respect to that particular facility. According to a preferred embodiment, management terminals disposed locally at a facility are provided data access to portions of the call processing platforms relevant to the operation of that facility via the aforementioned call processing gateway, such that it appears from the user's viewpoint as if a local call processor system is being accessed and maintained. Additionally or alternatively, independent WAN connections with respect to such management terminals may be supported according to embodiments of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 shows an embodiment of a centralized or nodal call processing system according to the present invention; and FIG. 5 shows a flow diagram of operation of a call processing system in providing calling services according to an embodiment.

DETAILED DESCRIPTION OF THE INVENTION

Figure 1A:
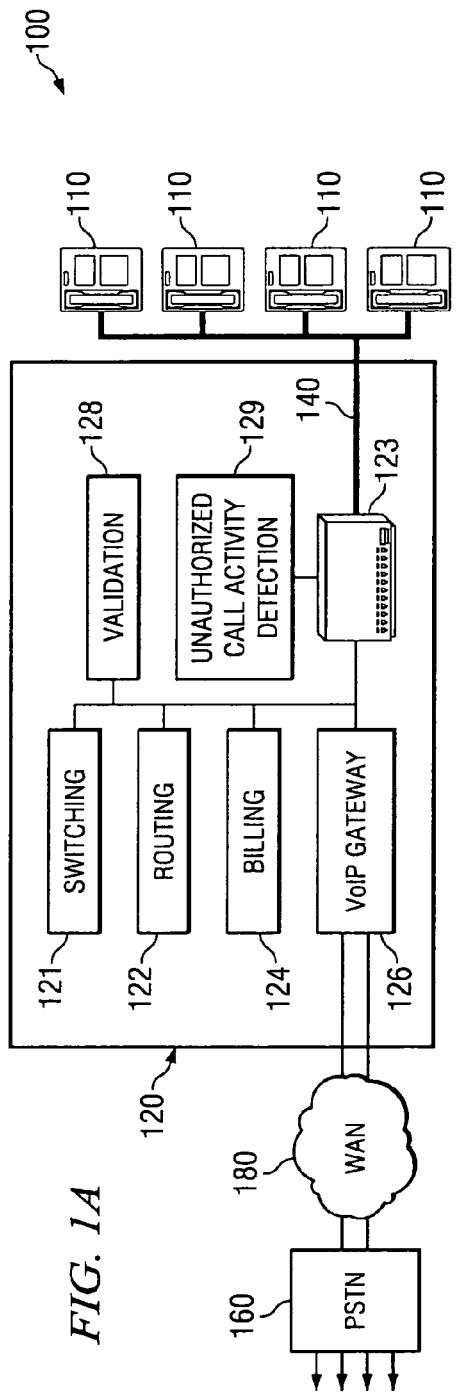
FIGS. 1A and 1B show block diagrams of controlled public telephone systems of the present invention.

FIG. 1A shows a controlled public telephone communication system as call processing system 100. Call processing system 100 of the embodiment illustrated in FIG. 1A includes a plurality of public telephone terminals 110 disposed at a location for which calling services are to be provided. The location may, for example, comprise a prison in which the use of the public telephones is monitored and controlled.

Although call processing systems of the present invention are described herein with reference to its configuration and use in providing calling services to jail or prison facilities in order to better aid the reader in understanding the concepts of the present invention, it should be appreciated that call processing systems of the present invention are not limited to use with respect to such facilities. Embodiments of the present invention may be utilized with respect to any number of locations in addition to or in the alternative to the aforementioned prison, such as hospitals, nursing homes, camps, dormitories, businesses, residences, kiosks, etcetera.

Telephone terminals 110 are connected to processor-based system 120 by wire lines 140. Processor-based system 120 may comprise a programmable computer having a central processing unit (whether general purpose or application specific), memory, and appropriate input/output interfaces, which is operable under an instruction set defining operation as described herein. Wire lines 140 may comprise analog voice lines, such as those associated with plain old telephone service (POTS). Wire lines 140 of embodiments of the invention may comprise digital communication links, such as those used between a digital private branch exchange (PBX) and its associated user stations. Line interface 123 provides interfacing between the signals native to telephone terminals 110 and a processor or processors of processor-based system 120.

As will be discussed in detail below, VoIP gateway 126 provides voice connectivity via WAN 180. WAN 180 may comprise any data network, such as an intranet, an extranet, the Internet, a public network, a private network, and/or the like. Although illustrated as a WAN, it should be appreciated that embodiments of the present invention may utilize data networks such as a local area network (LAN), a metropolitan area network (MAN), an intranet, an extra net, the Internet, and/or the like in combination with or in the alternative to a WAN.

Figure 1B:
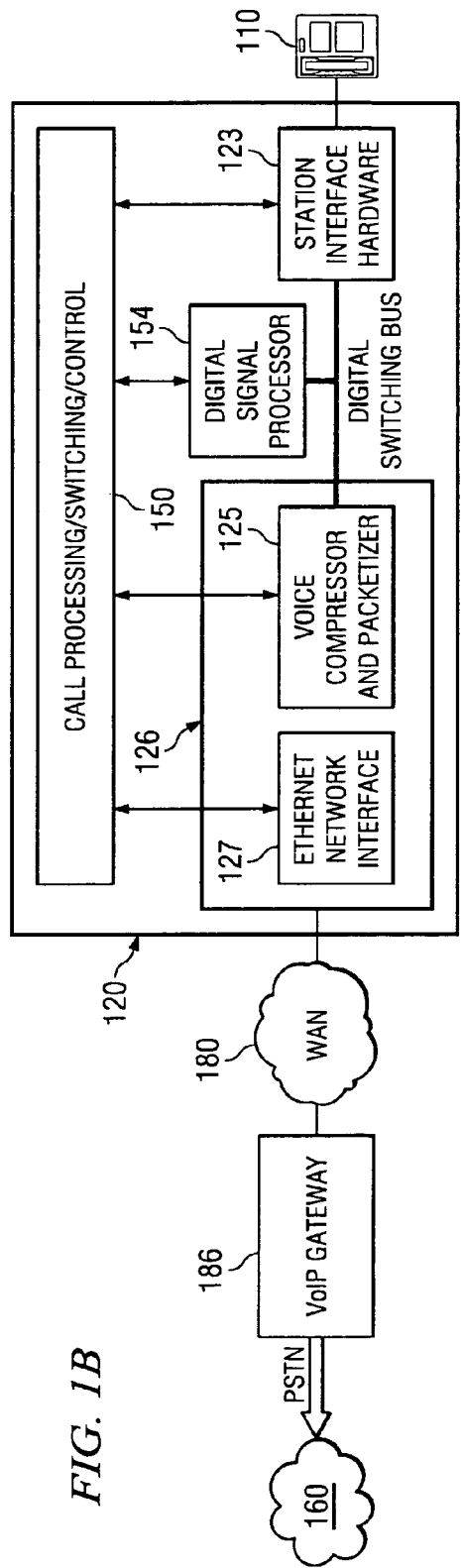

Telephone terminals 110 may be placed in voice communication with any of a number of user terminals via VoIP gateway 126 and WAN 180. For example, telephone terminals (not shown) connected to PSTN 160 may be placed in communication with one or more of telephone terminals 110 via VoIP gateway 126 and WAN 180, perhaps using a corresponding VoIP gateway (as shown in FIG. 1B) at an edge of WAN 180 coupled to PSTN 160. Additionally or alternatively, telephone terminals 110 may be placed in communication with devices such as video phones, multi-media computers, cellular phones, personal digital assistants (PDAs), and/or the like via VoIP gateway 126 and WAN 180, whether such devices are coupled to WAN 180 or PSTN 160.

The embodiment of FIG. 1A includes functionality of a call processing platform integrated with that of a call processing gateway. Accordingly, processor-based system 120 is shown including switching control block 121, routing control block 122, billing control block 124, validation control block 128, and unauthorized call activity detection control block 129 in addition to line interface 123 and VoIP gateway 126. Typically a prison environment such as is described in the example has rules and regulations regarding inmate telephone usage. Accordingly, switching control block 121, routing control block 122, billing control block 124, validation control block 128, and unauthorized call activity detection control block 129 may be utilized to cooperatively control, route, connect, disconnect, and account for calls.

For example, a user of one of telephones 110 may place the telephone in an off-hook condition and dial or otherwise provide user and/or account identification information, in addition to providing a destination number or other information with respect to a desired call to be placed. Validation control block 128, perhaps in cooperation with a call application management system and/or a call treatment system as are described below, may operate to verify the identity of the calling party, that the calling party is authorized to place a call, that the called party will receive calls or is authorized to receive calls from the calling party, that the calling party and/or called party have not exceeded a particular velocity of calls or a preselected value point (e.g., billing limit), that an identified prepaid account has sufficient monies to fund the call, that, in the case of a collect call, a billing arrangement exists between an entity responsible for billing calls to the called party and the service provider and that the called party presents an acceptable collection risk, etcetera.

Where the desired call has been validated, routing control block 122 may operate to determine an appropriate network routing for connecting the desired call. For example, routing control block 122 may determine a least cost routing connection, a best quality connection, a particular carrier to handle the call, such as based upon various call attributes, etcetera. Thereafter, switching control block 121 may control connection and disconnection of the desired call.

Billing control block 124 preferably operates to provide accounting, billing, and/or reconciliation of charges for calling and other services provided by call processing system 100. For example, billing control block 124 may cooperate with switching control block 121 to identify beginning and ending times of a call, with routing control block 122 to determine appropriate rate information for use with respect to the call, and with validation control block 128 for identification of calling/called parties and/or an account to be used with respect to a call. Additionally or alternatively, billing control system 124 may cooperate with a call application management system, as is discussed in detail below, to facilitate collection of billing information with respect to calls processed by call processing system 100.

Unauthorized call activity detection control block 129 is preferably operable to monitor a connected call to provide call intelligence for use in determinations with respect to allowing a particular call to be continued. According to one embodiment, unauthorized call activity detection control block 129 provides real-time intelligence with respect to fraudulent or otherwise unauthorized activity being attempted during a call. For example, unauthorized call activity detection control block 129 may employ silence detection techniques to identify attempts at establishing an unauthorized three-way call. According to one embodiment, unauthorized call activity detection control block 129 utilizes digital signal processing to detect three-way call attempts by establishing a baseline ambient, or background, noise level, and detecting when the call signal noise level drops below the ambient noise level.

It should be appreciated that call processing functionality may be provided in a call flow at one or more points based upon various considerations. For example, unauthorized call activity detection control block 129 may be coupled to a call flow at a point beyond or outside of the VoIP network. VoIP transmission utilizes voice compression and packetizing, which are often lossy and may be detrimental to the ability to perform unauthorized call activity detection, such as detection of three-way call attempts. Therefore, the illustrated embodiment shows unauthorized call activity detection control block 129 coupled to line interface 123, disposed in the call flow external to the VoIP data stream, to operate with respect to telephony signals which have not been compressed and packetized by VoIP gateway 126 and/or which have been decompressed and depacketized by VoIP gateway 126. Embodiments of the invention may dispose various aspects of call processing functionality in a call flow differently, whether inside or outside of the VoIP data stream, than shown in FIG. 1A. However, preferred embodiments adapt call processing functional blocks to utilize VoIP data streams where practical in order to realize benefits associated with easily routing voice over data connections and data compression of VoIP.

Processor-based system 120 of embodiments of the invention supports a variety of applications and functionality in addition to or in the alternative to that shown in FIG. 1A. For example, processor-based system 120 of embodiments of the invention are adapted to provide for remote configuration, management and back-up, bandwidth allocation and control, least cost routing, VoIP as well as various telephony related applications. Although not shown in the embodiment of FIG. 1A, interactive voice response (IVR) functionality, or other calling/called party interactive control interface, may be implemented with respect to placing, connecting, disconnecting, and billing a call. For example, a calling party may be solicited for information, such as the aforementioned identification information and called party number, using IVR functionality disposed either locally to telephones 110 (e.g., within processor-based system 120) or remotely therefrom (e.g., a call processing platform coupled to processor-based system 120 via WAN 180 and/or PSTN 160).

FIG. 1B shows additional detail with respect to a call processing system of an embodiment of the present invention. In the embodiment of FIG. 1B, processor-based system 120 includes software 150 for performing call processing functions, such as those of switching control block 121, routing control block 122, billing control block 124, validation control block 128, and/or unauthorized call activity detection control block 129. Line interface 123 is implemented as station interface hardware which provides an interface with the telephone terminals 110. Digital signal processor 154 is shown coupled to a digital switching bus of processor-based system 120 for processing signals from the telephone terminals 110 as programmed by the software 150. VoIP gateway 126 is also shown coupled to the digital switching bus of processor-based system 120 to provide an interface to PSTN 160 via WAN 180 and corresponding VoIP gateway 186.

VoIP gateway 126 includes compressor and packetizer 125 and network interface 127. Compressor and packetizer 125 produces compressed data packets from the telephony signals. These packets are processed in network interface 127 so that they can be applied through WAN 180 to corresponding VoIP gateway 186. The telephone signals may be decompressed and depacketized by VoIP gateway 186 and distributed to a public switch of PSTN 160.

In operation according to embodiments of the present invention telephone terminals 110 are selectively connected to off site PSTN 160 via WAN 180 and VoIP gateway 126. As previously discussed, processor-based system 120 preferably selectively connects appropriate ones of telephone terminals 110 with the VoIP gateway 126 for completion of desired calls. VoIP gateway 126 utilizes internet protocols to establish a packet switched network connection (in contrast to a circuit switched network connection of the PSTN) between a calling and called party to thereby connect a desired call.

Internet protocol ("IP") is a routing protocol designed to route traffic within a network or between networks. VoIP is a method for providing voice capabilities over an IP network, such as the Internet or an intranet. In such networks data packets are sent to and from communication sites to facilitate communication. In communication systems utilizing a VoIP protocol, the packets are commonly referred to as datagrams. In typical VoIP networks, each communication site sends datagrams to other communication sites in which they are in communication with. There are different approaches to sending datagrams, any of which may be implemented according to embodiments of the present invention.

In certain preferred embodiments, control signals per ITU recommendation H.323, and audio based media streams using RTP per Internet RFC 1889, are applied. Alternatively control signals could be applied using other protocols such as SIP per Internet RFC 2543.

VoIP gateway 126 of a preferred embodiment is provided to service and control VoIP communications. Various types of VoIP communications may be effectively managed and controlled in accordance with preferred embodiments of the present invention. Voice data may be processed by means of a vocoder (Voice Coder/Decoder), as may be provided in VoIP gateway 126. Voice coding and decoding as utilized according to embodiments of the invention may implement one or more of several standard schemes, such as ITU recommendation G.723.1, G.729, or G.711 among others.

In accordance with embodiments of the present invention, efficiency and lower costs are obtained through operation of call control systems, such as shown in FIG. 1A, implementing VoIP communication links in completing calls. For example, a state wide prison system may include thousands of telephone terminals which are to be controlled and for which calls are to be completed. Using the VoIP communication links described above, high speed data links may be utilized to trunk communication links utilized in completing calls, thereby eliminating the need for a large number of line connections to the PSTN. Often large administrative systems, such as those of such prison systems, have existing data networks which may be leveraged in providing VoIP communication links as described herein by providing a processor-based system with a VoIP gateway as described herein.

Moreover, call processing functionality, such as that discussed above, may readily be centrally located for optimized use by a plurality of locations, such as those of the aforementioned statewide prison system, using call processors of the present invention, thereby providing further efficiency and lower costs. Call control functions which may advantageously be disposed remotely with respect to a location for which calling services are provided include a wide array of editable call control parameters, advanced call monitoring, real time call recording, three-way call detection, fraud detection, and/or the like.

The distribution of call control functions may be accomplished with programming based on software architecture such as BubbleLINK® and equipment with the ability to enable a seamless connection between traditional circuit-based networks and digital packet-based networks. Such equipment includes the Integrator C-2000® series of IP Telephony Gateways and the Commander II Inmate Control phone system (also based on the Integrator C-2000® architecture).

Figure 2:
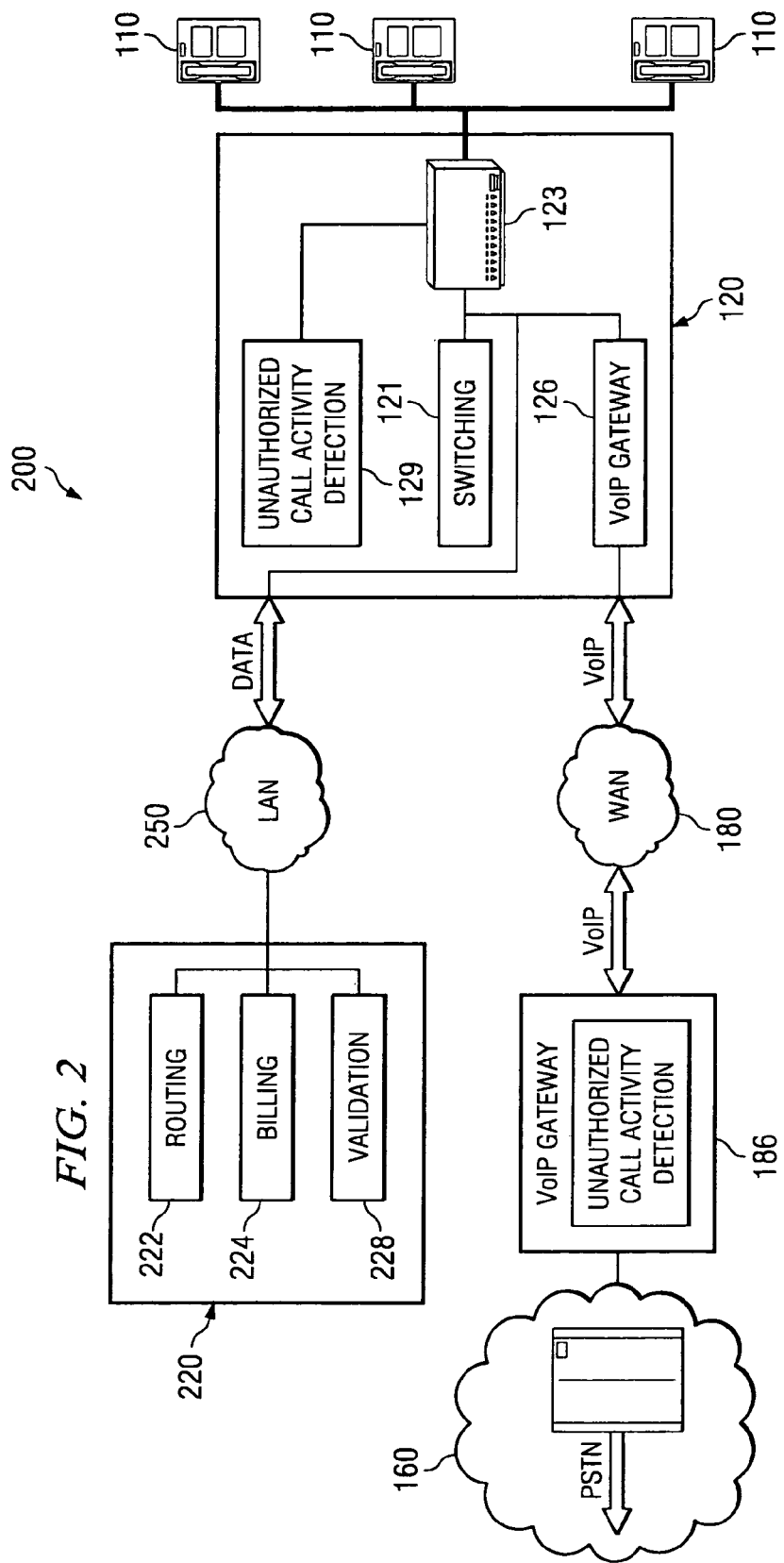
FIG. 2 shows an embodiment wherein control functions are disposed at locations remote from that of a public telephone system processor-based system.

FIG. 2 shows one embodiment wherein control functions are disposed at locations remote from that of processor-based system 120. Specifically, in call processing system 200 of FIG. 2, routing control block 222, corresponding to routing control block 122 described above, billing control block 224, corresponding to billing control block 124 described above, and validation control block 228, corresponding to validation control block 228 described above, have been disposed at a location remote from processor-based system 120. Accordingly, call processing system 200 of FIG. 2 provides an embodiment wherein processor-based system 120 provides a communication gateway or call processing gateway relying upon centrally disposed call processor platform 220 to provide the aforementioned call processing functions. Although not shown, call processing platform 220 may be coupled to a plurality of call processing gateways and provide call control functionality with respect to each such call processing gateway.

LAN 250, such as may comprise an Ethernet network provides data communication between call processor platform 220 and processor-based system 120. It should be appreciated that LAN 250 may comprise any data network, such as an intranet, an extranet, the Internet, a public network, a private network, and/or the like. Moreover, although illustrated as a LAN, embodiments of the present invention may utilize data networks such as a WAN, MAN, an intranet, an extranet, the Internet, and/or the like in combination with or in the alternative to a LAN. According to embodiments of the present invention, a same data network is utilized with respect to call control data communication provided between processor-based system 120 and call processing platform 220 and VoIP communication provided between processor-based system 120 and PSTN 160.

Figure 3:
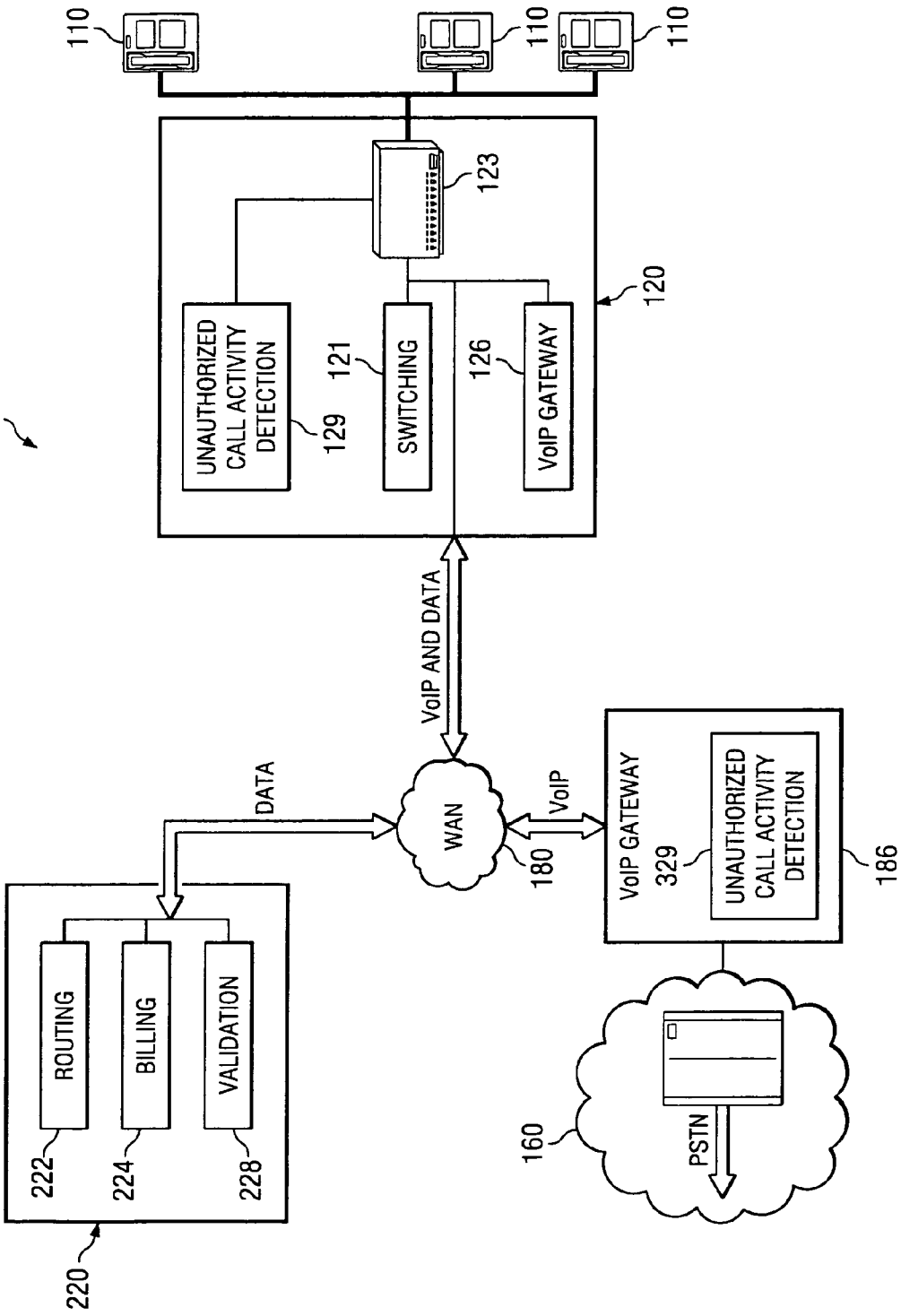
FIG. 3 shows the integration of VoIP and data networks.

The embodiment of call processor 300 shown in FIG. 3 shows the integration of VoIP and data networks. Specifically, call processor 300 of FIG. 3 provides a configuration in which telephone communication is integrated into the data exchange network. Accordingly, a data connection, such as a high speed data connection, may be utilized to provide both voice connections of desired calls as well as data communication, such as for facilitating the above described call control functions. Moreover, the embodiment of FIG. 3 provides a configuration which readily facilitates voice processing by call processing platform 220. For example, validation control block 228 may utilize voice print technology in identifying a calling and/or called party. Calling and/or called party utterances may be provided in a VoIP data stream to call processing platform 220, such as by VoIP gateway 126 and/or VoIP gateway 186. Similarly, VoIP data streams, such as may be generated by a voice response unit (VRU) of call processing platform 220, may be provided to the calling and/or called party via VoIP gateway 126 and/or VoIP gateway 186. The embodiment of call processor 200 shown in FIG. 2 may be similarly operated to provide VoIP data streams to/from call processing platform, such as via LAN 250 and/or WAN 180, if desired.

It should be appreciated that disposing one or more call control function remotely with respect to a processor-based system providing call control functionality with respect to a location for which calling services are provided does not necessarily mean that such a call control function is not also disposed locally. For example, the embodiments of FIGS. 2 and 3 show unauthorized call activity detection functionality disposed remotely with respect to processor-based system 120 as well as disposed locally thereto. Specifically, referring to FIG. 3, unauthorized call activity detection control block 329 is disposed to operate on a processor of VoIP gateway 186 in addition to unauthorized call activity detection control block 129 disposed in processor-based system 120. Although sharing a system housing, and possibly a processor, for convenience, unauthorized call activity detection control block 329 of a preferred embodiment is coupled to the call flow at a point beyond or outside of the VoIP network. Accordingly, as discussed above with respect to unauthorized call activity detection control block 129, unauthorized call activity detection control block 329 of embodiments of the invention operates with respect to telephony signals have not been compressed and packetized by VoIP gateway 186 and/or which have been decompressed and depacketized by VoIP gateway 186.

Unauthorized call activity detection control block 129 and unauthorized call activity control block 329 may cooperate to provide detection of unauthorized call activity to a high degree of accuracy. For example, because processor-based system 120 and/or call processing platform 220 operate to prevent calls being connected to particular called numbers, a called party may be expected to attempt a three-way call in order to circumvent call control implemented by the call processing system and place a calling party in communication with an otherwise unauthorized termination point. Accordingly, unauthorized call activity detection control block 329, disposed at a point in the call flow more near the called party, may operate to detect such three-way call attempts. Unauthorized call activity detection control block 129 may operate in a backup capacity to confirm and/or augment determinations made by unauthorized call activity detection control block 329. Additionally or alternatively, unauthorized call activity detection control block 129 may provide for detection of activity more likely to be instigated by the calling party, such as dialing a remote call forwarding number. Accordingly, the unauthorized call activity detection control blocks of embodiments of the present invention may cooperate to provide detection of unauthorized call activity through redundant detection, detection of different activities, shared partial processing, etcetera.

Embodiments of the present invention may utilized mixed modes, providing both local access wire circuits (analog or digital) and VoIP, for use in completing desired calls. For example, local access circuits may be utilized to transport local calls at fixed lower rates to a local exchange carrier (LEC), while VoIP circuits are utilized to transport higher cost long distance calls to an inter-exchange carrier (IXC). By connecting a plurality of sites on the WAN, multiple sites could share a common set of local access circuits. The sharing of local access circuits, called "edge routing," may be leveraged to negate a need for local access circuits at each facility.

Additionally or alternatively, embodiments of the present invention may share gateways for connecting VoIP data streams to the PSTN. For example, a centralized call processing platform may be utilized to provide a shared PSTN gateway for a plurality of facilities, in addition to providing shared call processing functionality.

Directing attention to FIG. 4, an embodiment of a centralized or nodal call processing system according to the present invention is shown as call processing system 400. Call processing system 400 of the illustrated embodiment includes call processing platform 401 in communication with facilities 450-480 via network 430. It should be appreciated that, although only a single call processing platform is represented in FIG. 4, any number of call processing platforms, perhaps having varied configurations and/or disposed at different geographic locations, may be implemented with respect to a call processing system of the present invention. Likewise, the number and configurations of facilities for which calling services may be provided by a call processing system of the present invention is not limited to that shown in FIG. 4.

Preferred embodiments of the present invention dispose one or more call processing gateways, shown here as call processing gateways 440, at or near sites for which call processing services are to be provided, here facilities 450-480. Call processing gateways 440 may provide interfacing and arbitration between a number of protocols, signals, and/or interfaces. For example, preferred embodiment call processing gateways 440 provide a plurality of analog telephone line interfaces (e.g., POTS line interfaces) for coupling to a plurality of telephone terminals 441 and providing loop current, dial tone, etcetera thereto. Preferred embodiment call processing gateways 440 further provide at least one WAN interface (e.g., T1 interface) for coupling to a data, e.g., packet switched, network. Call processing gateways 440 of this preferred embodiment provide conversion of analog signals associated with telephone terminals 441 and visitation telephones 443 and digital data packets of the packet switched network to provide a VoIP gateway. Call processing gateways 440 may include additional or alternative interfaces, such as LAN interfaces (e.g., 100 Mbit Ethernet interface), wireless interfaces (e.g., 802.11 interface), etcetera, if desired. Embodiments of the present invention utilize commercially available devices, such as the IAD 2400 series of integrated access devices available from Cisco Systems, Inc., San Jose, Calif., in providing a call processor gateway.

It should be appreciated that communications provided by call processing gateways 440 utilized according to the present invention are not limited to communication between devices implementing different protocols and/or signals. For example, communications between a plurality of telephone terminals disposed within a particular facility, e.g., visitation telephones 443 shown in facilities 450 and 480, may be provided by call processing gateways 440 of the present invention. Although not requiring signal/protocol conversion to facilitate communication between two such similarly configured devices, call processing gateways 440 of the present invention are preferably leveraged to provide such communication arbitration, e.g., analog to VoIP and VoIP to analog functionality, to provide a data stream to call processing platform 401 containing the communication content between such terminals, such as to provide word search and/or call recording as will be described further below.

A plurality of call processing gateways 440 may be disposed with respect to a particular facility, if desired. For example, a plurality of call processing gateways 440 may be coupled to cooperate in providing call processing services using a network, such as network 444. A network router or switch, such as router 445, may be utilized in coupling call processing gateways 440 to call processing platform 401 via network 430. Router 445 of preferred embodiments may provide communication security, such as in the form of firewall protection, if desired. Of course, other components, such as call processing gateway 440, may be configured to provide communication security in addition to or in the alternative to router 445.

A particular configuration and/or number of call processing gateways 440 utilized with respect to any of facilities 450-480 is preferably selected as a function of the facility's configuration. Depending upon the number of telephone terminals 441 to be provided calling services and/or the number of visitation telephones 443 at a particular facility (typical facilities may have from two telephones to approximately 600 telephones phones or more based on the physical size of the location), a configuration of call processing gateways 440 and/or a number of call processing gateways 440 deployed may be selected having more or less analog telephone line interfacing capacity. Similarly, depending upon the communication volume expected to be utilized at a particular facility, a configuration of call processing gateways 440 and/or a number of call processing gateways 440 deployed may be selected providing more or less bandwidth with respect to a WAN interface thereof. Where local management terminals, e.g., workstations 442, or other data processing equipment, e.g., justice application management system 447 and/or commerce system 446, is to be provided WAN access at a particular facility, a configuration of call processing gateways 440 may be selected to provide a LAN interface and/or appropriate WAN bandwidth.

The bandwidth of a connection between a particular facility and network 430 provided by a carrier access network may be scaled to correspond to an expected communication volume. For example, where relatively few telephone terminals 441 and/or visitation telephones 443 are present and management terminal or other data processing equipment communication is expected to be relatively low, a lower bandwidth connection (e.g., fraction of T1 or, perhaps in cases where reliability is not an issue, digital subscriber line (DSL) such as asynchronous DSL (ADSL) high bit rate DSL (HDSL) etcetera (referred to collectively as xDSL) or cable modem technology) may be provided. However, where a large number of telephone terminals 441 and/or visitation telephones 443 are present and/or management terminal or other data processing equipment communication is expected to be relatively high, a higher bandwidth connection (e.g., T1 or DS3) may be provided. These data links may be aggregated as they pass through the carrier's access network, thereby providing a larger bandwidth aggregated connection or connections (e.g., OC3 or OCX) from network 430 to call processing platform 401.

The data links between call processing gateways 440 and call processing platform 401 are preferably packet switched links, such as those provided using various IP or frame relay protocols. However, any type of data connectivity protocol that may be relied upon to deliver VoIP and data packets may be utilized according to embodiments of the present invention. Embodiments of the present invention may utilize carrier access network and backbone network links implementing protocols such as Ethernet, asynchronous transfer mode (ATM), synchronous optical network (SONET), and the like.

Call processing platform 401 of the illustrated embodiment includes router/switch 418 coupling network 430 to various systems and components comprising call processing platform 401 via network 411. Router/switch 418 of preferred embodiments may provide communication security, such as in the form of firewall protection, if desired. Of course, other components, such as validation system 413, may be configured to provide communication security in addition to or in the alternative to router/switch 418.

The illustrated embodiment of call processing platform 401 includes a number of functional aspects, ones of which may be omitted in optional configurations, shown as various systems cooperating to provide call processing according to embodiments of the present invention. Call application management system 410, billing system 412, validation system 413, unauthorized call activity detection system 414, call treatment system 415, call recording system 416, and media gateway 417 may be utilized in various combinations to provide primary calling service functionality according to embodiments of the present invention. Justice application management system 421 and/or commerce system 422 of call processing platform 401 may be utilized in providing enhanced functionality as will be described further below. It should be appreciated that, although the illustrated embodiment is described with reference to a justice application management system providing enhanced functionality with reference to use in providing calling services to jail or prison facilities, embodiments of the present invention may implement information management systems useful with respect to a variety of applications, such as hospital management, business management, demographic collection and/or analysis, usage statistics, etcetera. Accordingly, justice application management system 421 as shown in FIG. 4 may correspond to any number of information management systems providing data collection and/or sharing among facilities as described herein.

Call application management system 410 of the preferred embodiment, as may comprise one or more processor-based servers as are well known in the art, forms the heart of call processing functionality provided by call processing platform 401. For example, preferred embodiments of call application management system 410 control completing a call between a party using any one of telephone terminals 441 or visitation telephones 443 and another party, such as may be using one of visitation telephones 443 or a telephone terminal (not shown)

coupled to call processing platform 401 via SIP/MGCP network 491 or PSTN 492. Additionally or alternatively, call application management system 410 may include IVR, text-to-speech, voice recognition, and/or dual tone multi-frequency (DTMF) recognition/generation functionality such as may be useful for playing announcements to various ones of the calling and called parties, soliciting information (such as personal identification numbers (PINs), account numbers, called number, etcetera) from the parties, signaling other systems, etcetera.

Detail with respect to operation in providing call processing by a call application manager according to embodiments of the present invention is shown in the above referenced patent application entitled "Information Management and Movement System and Method." However, call application management system 410 of the embodiment illustrated in FIG. 4 herein provides a data interface coupling call application management system 410 to facilities 450-480 via network 430 and providing VoIP communication therebetween. Additionally, call application management system 410 of FIG. 4 provides a data interface coupling call application management system 410 to user terminals (e.g., telephone terminals, not shown) via SIP/MGCP network 491 and providing VoIP communication through the carrier network to a point more near the user terminal. Accordingly, call application manager 410 of a preferred embodiment need not implement analog voice cards for interfacing with particular user terminals and need not convert between digital and analog signal formats when providing communication between particular users.

Call processing platforms of the present invention are not limited to operation in the digital domain. Accordingly, the illustrated embodiment of call processing platform 401 includes media gateway 417 in communication with call application management system 410 via network 411. Media gateway 417 of a preferred embodiment, as may comprise one or more processor-based servers having analog voice cards as are well known in the art, provides interfacing and arbitration between a number of protocols, signals, and/or interfaces, such as to facilitate communications between digital VoIP protocols present on network 411 and analog protocols present on PSTN 492. Using media gateway 417, call application management system 410 may provide communications to user terminals (e.g., telephone terminals, not shown) via PSTN 492.

However, it should be appreciated that providing communication to a carrier in digital format, such as SIP or MGCP, may provide several advantages. For example, research has revealed that considerable cost advantages with respect to carrying the traffic through the public network may be realized when the communications are provided to the network in a digital format. The cost savings have been found to be significant with respect to interstate and interlata calls, such as on the order of $0.05 to $0.02 per minute. Additionally, issues of latency in processing digitally processed calls may be avoided by providing communication to a carrier in digital format by avoiding repeated conversion between digital and analog formats. Call quality may be improved through the use of digital communication in as much of the communication link as is possible, thereby avoiding signal degradation typically inherent in analog communication networks.

Embodiments of call processing platforms of the present invention are preferably coupled to multiple carriers (whether through POTS links, digital links, etcetera) to allow switching connections to be made by the call processing platform based upon considerations such as least cost routing, rate changes, regulatory issues, reliability issues, and/or the like. Call application management system 410 of one embodiment may make determinations with respect to a particular carrier network to utilize in connecting a calling party to a called party on a call by call basis or in response to a particular event. Preferred embodiments of the present invention provide the ability to switch quickly between available carriers in response to an event, such as a service disruption or rate change. In contrast, distributed call processing system architectures typically require a long period of coordination, physical dispatch, and often the implementation of different hardware to facilitate a switch between particular carriers providing calling connections.

Additionally or alternatively, call application management system 410 may cooperate with other systems to provide robust call processing functionality. For example, call application management system 410 may cooperate with validation system 413 and/or unauthorized call activity detection system 414 to provide call intelligence for use in determinations with respect to allowing a particular call to be continued. According to one embodiment, unauthorized call activity detection system 414 provides real-time intelligence with respect to fraudulent or otherwise unauthorized activity being attempted during a call. For example, unauthorized call activity detection system 414 may employ silence detection techniques to identify attempts at establishing an unauthorized three-way call. Detail with respect to detecting unauthorized call activity is provided in the above referenced patent applications entitled "Three-Way Telephone Call Prevention System and Method" and "System and Method for Detecting Unauthorized Call Activity," as well as in U.S. Pat. No. 5,768,355 entitled "Three-Way Call Detection System."

Call recording system 416 of the illustrated embodiment, as may comprise a SAN providing large amounts of data storage (e.g., terabytes), is coupled to call application management system 410 and operates under control thereof to store information with respect to calls. Information stored by call recording system 416 may comprise the content of the call, i.e., record the conversation or exchange of data provided by the call. Additionally or alternatively, information stored by call recording system 416 may comprise ancillary call information, such as identification of the calling and/or called party, calling number (e.g., automatic number information (ANI)), called number (e.g., dialed number information service (DNIS)), time of call, duration of call, account information, entity responsible for billing the call, and/or the like. Although the content of a call may be recorded in an analog format, preferred embodiments of the present invention record the content in a digital format to readily facilitate retrieval and/or playback via digital means, such as upon workstations 442 via network 430.

According to embodiments of the invention, call application management system 410 may signal call recording system 416 to record or not record particular calls processed by call processing platform 401. For example, all calls placed from any of facilities 450-480 to any party except an attorney representing a party to the call may be recorded by call recording system 416. It should be appreciated that, as the content of the call is provided in digital form, packets may readily be routed not only between a call processing gateway 440 and call application management system 410 for placing parties in communication, but also between call processing gateway 440, call application management system 410, or router 418 and call recording system 416 for archiving the content of the call.

Call processing gateways 440 of embodiments of the invention provide digital data streams including the content of calls not necessarily processed by call processing platform 401 to facilitate recording of those calls by call recording system 416. For example, although call application management system 410 may not be involved in a particular call between visitation telephones 443 of a facility, except perhaps to initially allow the connection and/or establish a time limit or other parameters for the connection, a data stream containing the content of the call may continue to be provided from a call processing gateway 440 to call processing platform 401 to facilitate archiving of the call content by call recording system 416.

It should be appreciated that disposing call recording system 416 at the centralized location associated with call processing platform 401 according to preferred embodiment provides several advantages. For example, infrastructure, such as the aforementioned SAN, which otherwise would be cost prohibitive to deploy with respect to a facility may be utilized in an optimized fashion. Moreover, individual facilities need not implement backup procedures for the archiving of recorded calls, thereby not only avoiding the administrative burden but quite likely avoiding the need for additional information technology personnel.

Call recording system 416 of embodiments of the present invention may provide functionality in addition to or in the alternative to archiving call content. For example, call recording system 416 may comprise processor-based functionality to analyze the content of calls for investigative or other purposes, such as to recognize particular words and phrases. Such word search functionality may cooperate with investigative functionality, as may be provided by justice application management system 421, to alert investigators of a potential threat associated with a caller's utterance of words such as "kill," "bomb," or particular names such as that of a victim or judge. Further detail with respect to investigative uses of such word search functionality as well as investigative functionality which may be provided using a call processor is shown in the above referenced patent application entitled "Information Management and Movement System and Method."

Validation system 413, as may comprise one or more processor-based servers as are well known in the art, may operate to make determinations with respect to allowing a particular call to be completed and/or continued. For example, validation system 413 may cooperate with call application management system 410 when a call is initiated to verify the identity of the calling party, that the calling party is authorized to place a call, that the called party will receive calls or is authorized to receive calls from the calling party, that the calling party and/or called party have not exceeded a particular velocity of calls or a preselected value point (e.g., billing limit), that an identified prepaid account has sufficient monies to fund the call, that, in the case of a collect call, a billing arrangement exists between an entity responsible for billing calls to the called party and the service provider and that the called party presents an acceptable collection risk, etcetera. Detail with respect to call validation functionality is provided in the above referenced patent applications entitled "Information Management and Movement System and Method," "Optimizing Profitability in Business Transactions," "System and Methods for Offering a Service to a Party Associated with a Blocked Call," and "Systems and Methods for Transaction Authorization Determination."

It should be appreciated that the validation process as provided by validation system 413 of a preferred embodiment provides improved validation determination response as compared to a typical distributed validation scheme. For example, where a distributed architecture is utilized, validation often requires a call processor local to the calling party to establish a link with one or more centralized clearing houses or other databases to perform a validation. However, the centralized configuration of the call processing architecture of FIG. 4 provides for communication between application management system 410 and validation system 413 locally, using packet transmissions, thereby facilitating improved validation determination responsiveness.

Additionally or alternatively, validation system 413 may cooperate with other systems to provide enhanced call validation. For example, validation system 413 may cooperate with call treatment system 415 to provide call intelligence for use in the aforementioned determinations with respect to allowing a particular call to be completed and/or continued. Accordingly, robust information, perhaps including information harvested from a signaling network, such as the signaling system 7 (SS7) network, may be utilized in call processing by call processing platform 401 of a preferred embodiment. For example, determinations with respect to a call forwarding feature being activated for a called number may be made from information available from SS7 data and, thus, validation system 413 may utilize this information in a determination as to whether the call should be completed. Detail with respect to use of call intelligence for use in making determinations with respect to the treatment of calls is shown in the above referenced patent application entitled "System and Method for Call Treatment."

Additionally or alternatively, validation system 413 may cooperate with other systems of call processing system 400 to provide robust call processing functionality. For example, when identifying a call directed to a certain telephone number, rather than blocking the call attempt, validation system 413 may cooperate with justice application management system 421 to notify an investigator that a call was made to that telephone number and/or to forward the call content for monitoring purposes to an investigator's telephone (e.g., cell phone or office phone) number. Detail with respect to such intelligence functionality is provided in the above referenced patent application entitled "Information Management and Movement System and Method."

Billing system 412, as may comprise one or more processor-based servers as are well known in the art, may operate to provide accounting, billing, and/or reconciliation of charges for calling and other services provided by call processing system 400. For example, billing system 412 may cooperate with call application management system 410 to collect billing information with respect to calls processed by call processing platform 401. This information may be used in real-time to deduct monies from prepaid accounts associated with a party to the call, to compile call detail records for out-clearing to local exchange carriers providing service to a called party, to provide direct billing by the service provider, etcetera. Detail with respect to accounting, billing, and reconciliation functionality is provided in the above referenced patent applications entitled "Information Management and Movement System and Method," "System and Method for Reverse Billing of a Telephone Call," "Method for Determining an Entity Responsible for Billing a Called Party," and "Method and Apparatus for Exchanging Data Between a Primary Computer System and an External Computer System to Ensure Transaction Reconciliation Between the Systems."

Additionally or alternatively, billing system 412 may cooperate with other systems to provide robust call processing functionality. For example, billing system 412 may cooperate with validation system 413 to provide billing information or portions thereof for use in the aforementioned determinations with respect to allowing a particular call to be completed and/or continued. As a specific example, debit card amounts may be debited real time by billing system 412 and the debit card threshold monitored by validation system 413 to shut off a call immediately upon crossing the debit card threshold. Accordingly, real-time, dynamic control of call processing services may be provided by embodiments of the present invention without the delay associated with periodic polling of distributed and/or discrete systems.

Billing system 412 of embodiments of the present invention implements various functionality to facilitate the performance of revenue producing services and/or to optimize the amounts of revenues and/or profits attained. For example, billing system 412 may cooperate with validation system 413 and/or call application management system 410 to solicit funds from a party or create a prepaid account when a collection risk is determined to be unacceptably high or monies are not otherwise available to fund a call. Accordingly, embodiments of the present invention provide the ability to set up a call account real-time, e.g., when a caller picks up a telephone terminal in a served facility but has not already established a way to bill the call. Detail with respect to such functionality is shown in the above referenced patent application entitled "System and Method for Account Establishment and Transaction Management Using Interrupt Messaging."

Billing system 412 may additionally or alternatively provide intelligent management of accounts receivable, such as to hold out-clearing of call detail records to local exchange carriers to consolidate call charges on billing statements, to maintain visibility and control with respect to accounts, to allow flexibility in account collection, etcetera. Detail with respect to intelligent account management functionality is shown in the above referenced patent application entitled "Intelligent Queuing of Transaction Requests."

It should be appreciated that, because call processing platform 401 of the preferred embodiment provides call processing with respect to a plurality of facilities, embodiments of the present invention include the capability to segment the data being stored in relation to each facility. For example, all of the calling records, all the call recordings, system parameters and configuration settings, etcetera may be tagged or otherwise associated with the facility to which it belongs. Using such information, call processing system 400 of a preferred embodiment is able to control access to the data when a user logs onto the central data from a facility, based on their logon ID information, where they are logging in from, or other information. A user logging on from a particular facility may be provided only information associated with that facility for which their logon ID provides them access. For example, a user at workstation 442 at facility 480 may be provided access to play recorded calls made from facility 480, provided that user's logon ID permits such activity. Similarly, a user at workstation 442 at facility 460 may be allowed to change configuration settings, such as preselected value points establishing billing limits, blocked telephone numbers, etcetera, affecting operation of call processing platform 401 with respect to facility 460, provided that user's logon ID permits such activity. Of course, using appropriate security protocols, users are not limited to data access to the call processing platform from terminals disposed at the various facilities and, therefore, may access aspects of the systems from other remote locations.

It should be appreciated that a virtual local facility call processor system is provided using the aforementioned management terminals disposed locally at a facility and coupled to the centralized call processing platform via a data connection. Accordingly, a facility can enjoy the benefits of having a call processor system without the full expense of such systems. For example, in the illustrated embodiment, a facility may have only a few telephone terminals, a general purpose computer system for use as a management terminal, and a data network connection coupled to a call processing gateway in order to receive the benefits of a full featured call processing system of the present invention. Expansion and updating of such a call processing system with respect to each facility is highly simplified as most updates and expansions may be accomplished centrally, at the call processing platform, without direct involvement of the facility or its personnel. Where the facility or its personnel are involved in an expansion or update, such as to increase communication capacity, the level of such involvement is expected to be insubstantial, such as to deploy additional call processing gateways, connect additional telephone terminals thereto, and provide a network connection.

Moreover, the centralized configuration of call processing platforms of embodiments of the present invention may be utilized to provide additional advantages. For example, data associated with a plurality of facilities may be made available for sharing, aggregation, and/or analysis. According to one embodiment, particular facilities, such as facilities within a same county or state are provided shared data access to collect intelligence, to improve facility management, to minimize administrative burden, etcetera. As one specific example of data sharing between facilities, assume that facility 450 corresponds to a local police department and that facility 470 corresponds to a county prison facility to which prisoners of the police department are transferred when incarcerated for extended periods of time. Booking in an inmate into the jail at the local police department of facility 450 enters the inmate information into a justice application management database coupled to call processing platform 401, such as within justice application management system 421. That inmate may be uniquely coded, such as by assigning a inmate number or using otherwise unique information (e.g., social security number), and might even be given a machine readable version of the unique code (e.g., a barcoded wristband). When transferred from the jail at the local police department of facility 450 to the county prison of facility 470, the inmate's unique code (such as might be scanned from the aforementioned barcoded wristband) may be utilized to populate a database entry of facility 470, such as within justice application management system 421 of call processing platform 401 and/or justice application management system 447 of facility 470. Accordingly, the administrative time associated with soliciting and entering such information is foregone, as well as the added opportunity for data entry error avoided.

It should be appreciated that access to data made available by call processing systems of the present invention is not limited to data connections from a facility site, such as WAN connections from workstations 442 to call processing platform 401. For example, access to such data may be provided via an application service provider (ASP) type configuration, such as may be provided via the Internet. An ASP hosting site may be collocated with other functional aspects of a call processing platform of the present invention or could be hosted at other locations, such as using WAN connections to a call processing platform.

Advantages in the sharing, aggregation, and/or analysis of data extends beyond the situation where associated or otherwise affiliated facilities share data. Where a large number of facilities are coupled to a centralized call processing system of the present invention, such data sharing, aggregation, and/or analysis provides appreciable advantages in conducting homeland security. For example, an appreciable amount of homeland security intelligence may be gleaned from data derived from all of the inmates and all of the facilities, such as all of their calling records, all of their calling patterns, all of their call recordings, etcetera, which might be scrubbed and parsed to find patterns indicative of particular activities.

It should be appreciated that additional advantages of embodiments of a centralized call processing system are exemplified in the foregoing example. Enhanced features may be provided with respect to a facility which might not otherwise have the funding or work load to fully justify the expense for the corresponding infrastructure. For example, justice application management, which may comprise a back office software product for a jail to facilitate management of the inmates in the facility (e.g., what cells they are assigned to, what medications are to be administered to them, tracking their medical records, tracking their privileges, etcetera), management of facility personnel (e.g., scheduling working hours, tracking vacation days, administering benefits, etcetera), management of facility resources (e.g., scheduling use of vehicles and conference rooms, establishing telephone availability schedules, etcetera), and/or providing intelligence functionality (e.g., investigative analysis of call and money flow data, analyzing call and commerce transaction velocity, etcetera), may be highly desirable to all of facilities 450-480 but economically out of reach of all but the largest of these facilities. However, because a plurality of facilities are served, infrastructure costs may be spread across a number of such facilities to make it practical to provide such enhanced features to any or all facilities.

Moreover, although larger facilities are free to take advantage of such shared infrastructure, embodiments of the present invention accommodate distributed deployment of such infrastructure, such as where a facility has a legacy system in place or where a facility has a sufficient work load to justify local deployment of particular infrastructure. In the case where justice application management system 447 is disposed locally with respect to a facility, embodiments of the present invention may provide backhauling of data to the centralized call processing platform for backup purposes, for centralized storage, for sharing, etcetera. Additionally or alternatively, the data network provided by call processing system 400 may be utilized to link two or more justice application management systems 447 for sharing of data between facilities. The data connections via network 430 of the illustrated embodiment facilitate sharing of data in any of the foregoing configurations.

Enhanced functionality provided by embodiments of centralized call processing systems of the present invention is not limited to the aforementioned justice application management functionality. For example, in addition to or in the alternative to justice application management system 421 disposed at a call processing platform of the present invention, commerce system 422 may be disposed at a call processing platform to provide various commerce functions. For example, inmates or other residents of facilities 450-480 may utilize telephone terminals 441 to place commissary orders, such as for candy bars, cigarettes, bed sheets, toiletries, etcetera. By bringing all this data back to a central site, embodiments of the present invention enable a commissary company to readily deploy commissary functionality with respect to a number of facilities which might not otherwise be economically feasible to do so. Moreover, commissary data with respect the various facilities may be aggregated for electronic delivery to the commissary company, without the commissary company having to deal with placing commissary systems at every facility to collect this data. Of course, as with the justice application management functionality discussed above, where such functionality is provided locally with respect to a facility, such as by commerce systems 446, the data links of the present invention facilitate operation therewith.

It should be appreciated that the use of resources in addition to the aforementioned call application management system, call recording system, justice application management system, and commerce system may be optimized by embodiments of the present invention. For example, customer service agents (not shown) may be provided with respect to call processing platform 401 to provide such services as account establishment, call assistance, etcetera, even where call volume associated with any one of facilities 450-480 is insufficient to economically support such personnel.

Similarly, the use of communication lines may be optimized using a centralized configuration of the present invention. For example, where discrete call processing systems are deployed with respect to facilities, it may be necessary to purchase telephone lines on the order of one to every two or three telephone terminals provided at the facility. However, centralized configurations of the present invention are expected to allow improved telephone trunking such that telephone lines on the order of one to every four or five telephone terminals served at the facilities by the call processing platform will be sufficient. Such efficiencies in telephone trunking may be achieved because each of the facilities is unlikely to be experiencing similar calling demand simultaneously. For example, the call processing system may provide services to facilities in different time zones, allowing one facility to utilize telephone lines at a time another facility is not using the telephone lines. Additionally, some facilities may be experiencing periods of exceptionally low telephone utilization, such as during lock-down, allowing the system to readily accommodate other facilities experiencing periods of exceptionally high telephone utilization, such as associated with a facility providing unusually numerous break periods to inmates. The variations in calling across all of the facilities allows centralized call processing systems of the present invention to optimize utilization of bandwidth.

It should be appreciated that the aforementioned trunking of resources at the call processing platform substantially mitigates capacity limitations with respect to each particular facility. For example, rather than being limited at any one instant to processing a number of calls equal to the individual telephone lines (or telephone line equivalents) purchased with respect to a particular facility, embodiments of the present invention will allow processing of a number of calls equal to the number of telephone terminals at a particular facility. Such instantaneous peak capacities may be accommodated in part by embodiments of the present invention taking advantage of the fact that digital communication, e.g., VoIP, allows aggregating calls into less bandwidth as well as taking advantage of the optimized utilization of bandwidth as discussed above.

Having described embodiments of the various aspects of a call processing system of the present invention above, reference will now be made to FIG. 5 wherein a flow diagram of operation of such a call processing system in providing calling services according to an embodiment is shown. Operation according to the flow diagram illustrated in FIG. 5 begins at step 501 were a calling party places a telephone terminal, such as one of telephone terminals 441, in an off hook condition. At step 502, a call processing gateway, such as one of call processing gateways 440, coupled to the telephone terminal establishes a link between the telephone terminal and a centralized call processing platform of the present invention, such as call processing platform 401. The link between the telephone terminal and call processing platform may be established by call processing gateway providing loop current to the telephone terminal and beginning a VoIP packet flow directed to an IP address associated with the call processing platform via a packet network, such as network 430.

At step 503 of the illustrated flow diagram, the call processing platform interacts with the calling party and collects call data, such as by utilizing IVR functionality of call application management system 410. The aforementioned interaction with the calling party may comprise soliciting calling party identification information and/or presenting menu options, such as may allow selection of placing an outbound call, ordering commissary items, and checking an account balance. These menu selections may present further queries based upon the menu selection made. For example, when the calling party selects placing an outbound call, the call application management system may solicit a number to be called and a desired payment method (e.g., prepaid account, postpaid account, collect call, etcetera).

Assuming outbound calling services are desired, the illustrated flow diagram proceeds to step 504 wherein the call application management system interacts with the validation system to determine call treatment. For example, validation system 413 may analyze calling party identification information to verify that the party has outbound calling privileges at the present time. Additionally or alternatively, validation system 413 may analyze the number to be called to verify that calls are allowed to be placed to that number. Validation system 413 may further analyze the desired payment method, perhaps interacting with call treatment system 415 and/or billing system 412, to determine if sufficient funds are available to allow the call and/or to determine if an acceptable risk with respect to collecting monies is associated with the desired payment method.

A determination is made at step 505 with respect to whether the call is authorized based upon information provided by the validation system. If the call is determined not to be authorized at step 505, processing according to the illustrated embodiment proceeds to step 506 wherein the call application management system does not connect the call, perhaps playing a message to the calling party stating the reason(s) the call will not be completed. However, if the call is determined to be authorized at step 505, processing according to the illustrated embodiment proceeds to step 507 wherein the call application management system connects the call.

It should be appreciated that processing of the call according to embodiments of the invention to this point in the illustrated flow diagram has been in the digital domain, with the exception of the link between the telephone terminal and the call processing gateway. Preferred embodiments of the present invention provide connection of the call to a carrier network, such as SIP/MGCP network 491, in digital format. However, embodiments of the present invention may provide connection of the call to a carrier network, such as PSTN 492, in analog format, such as by call application management system 410 cooperating with media gateway 417 to connect the call.

There is no limitation according to the present invention that connection to a carrier network being provided at the centralized location of the call processing platform. For example, a caller in a particular facility may place a call to a called party which is local to the facility, whereas the centralized location is not. In such a situation, call application management system 410 of an embodiment of the present invention may implement the call connection by "hairpinning" the call content data (e.g., VoIP data packets) back through network 430 to the call processing gateway 440 of the particular facility and controlling call processing gateway 440 to connect the data stream to an interface coupled to a local carrier line, where such a line has been provided. Alternatively, call application management system 410 of embodiments of the present invention may provide a control signal to call processing gateway 440 to direct call content data (e.g., VoIP data packets) to an interface coupled to a local carrier line. Even where such local carrier connections are supported, embodiments of the present invention continue to provide call content data streams from the call processing gateway to the call processing platform, such as for recording of the call by call recording system 416, accounting for the call by billing system 412, and/or real-time monitoring of the call by call application management system 410, unauthorized call activity detection system 414, and/or word search functionality of call recording system 416.

It should be appreciated that the aforementioned redirection of the call content data stream for local carrier connection at a facility is not limited to redirection at the facility at which the calling party is located. For example, it may be determined that, although a called party is not local to the call processing platform, the called party is local to a facility of the call processing system other than that associated with the calling party. Accordingly, where that facility supports local carrier connections, a call application management system of the present invention may redirect the call content data flow for local connection by that facility.

Although it may appear at first impression that connection of call content data streams to carrier networks at a centralized location such as that associated with call processing platform 401 may unnecessarily incur long distance and other toll charges, research has revealed that contrary to such conventional thoughts significant savings may be had through an embodiment employing centralized carrier connection. In a typical scenario, one may expect to pay approximately $0.05 per minute for intralata calling and from approximately $0.02 to $0.03 per minute for interstate calling where significant call volume is present. Also typically, one may expect to pay no per minute charges for local calling, although a monthly line charge will be incurred for having line availability. In contrast, however, research has revealed that intralata and interstate calling may be provided for per minute charges on the order of $0.01 when calls are delivered to the carrier network in digital format (e.g., SIP), which presents a significant savings over the above interlata call charges and appreciable savings over the above interstate call charges. Accordingly, even where calls local to a facility and would not otherwise experience a per minute charge, embodiments of the present invention are expected to provide economic savings by backhauling the call to a centralized location for connection to a carrier network. These economic advantages are further expected to be enhanced through the optimization of bandwidth, as discussed above, allowing a reduced number of total lines to be purchased, thereby lowering the monthly line charges to the service provider.

Continuing with the flow diagram illustrated in FIG. 5, after connecting a call at step 507, the call application management system interacts with other systems of the call processing platform in providing a continued connection at step 508. For example, call application management system 410 may signal call recording system 416 to record the call content. Additionally or alternatively, call application management system 410 may cooperate with unauthorized call activity detection system 414 to ensure that a calling or called party does not implement an unauthorized calling feature, such as three-way calling, during the call.

At step 509 a determination is made as to whether the call is terminated. For example, call application management system 410 may determine that an attempt has been made to implement an unauthorized calling feature and therefore may terminate the call. Similarly, call application management system 410 may determine that a call time limit or account balance has expired and therefore may terminate the call. Alternatively, either of the calling or called parties may terminate the call. If it is determined that the call has not been terminated at step 509, the illustrated embodiment returns to step 508 for the call application management system to continue interaction with other systems of the call processing platform in providing a continued connection. However, if it is determined that the call has been terminated at step 509, processing according to the illustrated embodiment proceeds to step 510 wherein the call application management system releases the call.

Although embodiments herein have been described with reference to telephone terminals, it should be appreciated that the present invention is not limited to use with respect to any particular type of user device. For example, video phones, multi-media computers, cellular phones, personal digital assistants (PDAs), and the like may be coupled to a call processing platform of the present invention for providing call processing services, if desired.

Additionally, although embodiments herein have been described with reference to a calling party being disposed at a facility or location for which calling services are provided by a call processing system of the present invention and a called party being disposed remotely thereto, there is no limitation according to the present invention that a call processing system be used for placing outbound calls. Accordingly, a calling party may utilize a telephone terminal disposed remotely with respect to a facility or a location for which calling services are provided. Similarly, a called party may utilize a telephone terminal disposed locally with respect to a facility or a location for which calling services are provided.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A call processing system for processing calls associated with a prison facility, comprising:
   a first processor-based system coupled to a plurality of telephone terminals disposed within said prison facility, said first processor-based system transmitting first voice signals associated with one or more of said plurality of telephone terminals, wherein the first processor-based system comprises a first unauthorized call activity detector for monitoring fraudulent or unauthorized call activity associated with the calls; and
   a second processor-based system communicating with said first processor-based system via a digital data link and disposed remotely from the first processor-based system, said second processor-based system configured to:
      establish calls to called parties requested by the one or more of the plurality of telephone terminals;
      convert the first voice signals for transmission over a carrier network responsive to receiving the first voice signals via the digital data link; and
      convert second non-VoIP (Voice over Internet Protocol) voice signals from the called parties received via the carrier network to second VoIP voice signals for transmission to the first processor-based system via the digital data link; and wherein the second processor-based system comprises:
      a second unauthorized call detector for monitoring the second non-VoIP voice signals to detect the fraudulent or unauthorized call activity in the calls; and
      a call processing platform for validating a billing limit.

2. The system of claim 1, wherein the first voice signals and the second VoIP voice signals are transmitted between the first processor-based system and the second processor-based system via voice over Internet protocol data packets.

3. The system of claim 1, wherein said first processor-based system switches the calls based on control by said second processor-based system.

4. The system of claim 1, wherein the second processor-based system performs call routing for the calls.

5. The system of claim 1, wherein the second processor-based system verifies personal identification number (PIN) of a caller placing a call by one of said plurality of telephone terminals.

6. The system of claim 1, wherein the second processor-based system processes billing associated with placing a call using said plurality of telephone terminals.

7. The system of claim 1, wherein said second processor-based system comprises a call processing platform providing at least one of billing and routing associated with the calls made via said first processor-based system.

8. The system of claim 7, wherein said call processing platform provides at least one of billing, validation and routing associated with calls made via a third processor-based system disposed at another prison facility.

9. The system of claim 7, wherein said first processor-based system comprises a voice over Internet protocol gateway coupled between the plurality of telephone terminals and the digital data link.

10. The system of claim 1, wherein said second processor-based system comprises a network edge device coupled to the digital data link.

11. The system of claim 10, wherein said network edge device comprises a gateway between said digital data network and the carrier network.

12. The system of claim 11, wherein said carrier network comprises a public switched telephone network.

13. The system of claim 10, wherein said network edge device comprises a voice over Internet protocol gateway.

14. The system of claim 1, wherein the fraudulent or unauthorized call activity comprises a three-way call.

15. The system of claim 1, wherein said second processor-based system performs speech recognition on the calls placed by the plurality of telephone terminals.

16. The system of claim 1, wherein the second processor-based system performs call monitoring and call recording on the calls placed by the plurality of telephone terminals.

17. A prison facility call processing system comprising:

a call processing platform communicating with a plurality of processor-based systems via digital data links, each processor-based system associated with a prison facility, the call processing platform located remotely from at least one of the plurality of the processor-based systems, said call processing platform being coupled to a carrier network and configured to:

establish calls from a plurality of telephone terminals in the plurality of process-based systems;

receive first voice signals from the plurality of processor-based systems via the digital data links;

send the first voice signals over a carrier network to called parties;

send second non-VoIP (Voice over Internet Protocol) voice signals from the called parties via the carrier network;

convert the second non-VoIP voice signals to second VoIP voice signals for transmission over the digital data links to the plurality of prison facilities; and monitor the second non-VoIP voice signals to detect fraudulent or unauthorized call activity in the calls; and a plurality of call processing gateways, each call processing gateway associated with a prison facility and configured to:

process the second VoIP voice signals for transmission to a plurality of telephone terminals in the prison facility and for detecting the fraudulent or unauthorized call activity in the calls, generate the first voice signals responsive to receiving call signals from the plurality of telephone terminals, and validate a billing limit.

18. The system of claim 17, wherein said digital data links provide voice over Internet protocol data communication between said plurality of prison facilities and said call processing platform.

19. The system of claim 17, wherein said fraudulent or unauthorized call activity comprises a three-way call.

20. The system of claim 17, wherein said call processing gateways provide interfacing between at least one analog telephone line interface and said digital data links.

21. The system of claim 17, wherein said call processing gateways comprise voice over Internet protocol gateways.

22. The system of claim 17, wherein said call processing gateways provide at least one local area network interface for coupling a computer workstation to said call processing platform via said digital data links.

23. A method for providing prison facility call processing in a centralized call processing system, said method comprising:

communicating with a plurality of processor-based systems via digital data links, each process-based system collecting call signals for establishing calls from telephone terminals in a prison facility, at least one of the processor-based system located remotely from the centralized call processing system;

receiving first voice signals collected by one of the plurality of processor-based systems via the digital data link;

converting the first voice signals for transmission over a carrier network;

receiving a second non-VoIP (Voice over Internet Protocol) second voice signal from the called party via the carrier network;

converting the second non-VoIP voice signal to a second VoIP voice signal for transmission over the digital data link to the one of the plurality of processor-based systems and for monitoring fraudulent or unauthorized call activity at the one of the plurality of process-based systems;

performing validation of a billing limit; and monitoring the second non-VoIP voice signal for the fraudulent or unauthorized call activity.

24. The method of claim 23, wherein said fraudulent or unauthorized call activity comprises three-way calling.

25. The method of claim 23, further comprising:

routing the call to the called party;

determining acceptance of the call by the called party, the call established responsive to the acceptance of the call by the called party; and creating call billing information associated with the call.

26. The method of claim 23, further comprising performing speech recognition on the call.

27. The method of claim 23, further comprising recording the call.

28. The system of claim 1, wherein the second processor-based system discontinues the calls responsive to detecting the fraudulent or unauthorized call activity in the calls.

29. The system of claim 17, wherein the call processing platform discontinues the calls responsive to detecting the fraudulent or unauthorized call activity in the calls.

30. The method of claim 23, further comprising discontinuing the call responsive to detecting the fraudulent or unauthorized call activity.

31. The system of claim 1, wherein the fraudulent or unauthorized call activity is detected by applying silence detection techniques to the second non-VoIP voice signals.

32. The system of claim 17, wherein the fraudulent or unauthorized call activity is detected by applying silence detection techniques to the second non-VoIP voice signals.

33. The method of claim 23, wherein the fraudulent or unauthorized call activity is detected by applying silence detection techniques to the second non-VoIP voice signals.

* * * * *